United States Patent
Mellen-Garnett et al.

(10) Patent No.: US 7,020,880 B2
(45) Date of Patent: *Mar. 28, 2006

(54) MODULAR APPLICATION COLLABORATOR FOR PROVIDING INTER-OPERABILITY BETWEEN APPLICATIONS AND MONITORING ERRORS TO TRIGGER EXECUTION OF REQUIRED COMPENSATING ACTIONS TO UNDO INTERRUPTED TRANSACTION

(75) Inventors: Katrina A. Mellen-Garnett, Hillsborough, CA (US); Prashant Gupta, Monterey, CA (US)

(73) Assignee: International Business Machines Corporation, Armonk, NY (US)

( * ) Notice: Subject to any disclaimer, the term of this patent is extended or adjusted under 35 U.S.C. 154(b) by 613 days.

This patent is subject to a terminal disclaimer.

(21) Appl. No.: 10/320,314

(22) Filed: Dec. 16, 2002

(65) Prior Publication Data

US 2003/0093479 A1 May 15, 2003

Related U.S. Application Data

(63) Continuation of application No. 09/527,111, filed on Mar. 16, 2000, now Pat. No. 6,507,875, which is a continuation-in-part of application No. 08/780,593, filed on Jan. 8, 1997, now Pat. No. 5,913,061.

(51) Int. Cl.
*G06F 3/00* (2006.01)
(52) U.S. Cl. .................... 719/310; 719/328; 718/101
(58) Field of Classification Search ............... 719/310, 719/328; 718/101
See application file for complete search history.

(56) References Cited

U.S. PATENT DOCUMENTS

| | | | | |
|---|---|---|---|---|
| 5,732,270 A | * | 3/1998 | Foody et al. | 719/316 |
| 5,787,300 A | * | 7/1998 | Wijaya | 712/1 |
| 5,854,750 A | * | 12/1998 | Phillips et al. | 700/216 |
| 5,870,545 A | * | 2/1999 | Davis et al. | 709/201 |
| 5,872,971 A | * | 2/1999 | Knapman et al. | 718/101 |

OTHER PUBLICATIONS

Orfali et al., The Essential Client/Server Survival Guide, second eddition, Wiley Computer Publishing, pp. 263-274, 1996.*

Dolgicer, Max, "A Formal Look at Tuxedo", Data Communications, pp. 1-4, vol. 22, No. 12, Sep. 1993.*

Betz, Mark, "Interoperable objects: laying the oundation for distributed-object computing", Dr. Dobb's Journal, vol. 19, No. 11, pp. 1-22, Oct. 1994.*

* cited by examiner

*Primary Examiner*—Meng-Al T. An
*Assistant Examiner*—Lilian Vo
(74) *Attorney, Agent, or Firm*—Michael J. Buchenhorner; Prentiss Johnson Holland & Knight LLP

(57) ABSTRACT

An interchange server for coupling with a plurality of connectors comprises an application collaboration module for defining the generic portion of the inter-operability function. The application collaboration module comprises a transaction service responsive to a trigger for initiating the inter-operability function and being activated upon receipt of data from one or more connectors. The trigger and the transaction deliver data to one or more connectors for transfer to an associated application whereby the inter-operability function is realized while each application is executing independently in an unmodified state. The connectors are configured for communicating with a like plurality of applications.

4 Claims, 15 Drawing Sheets

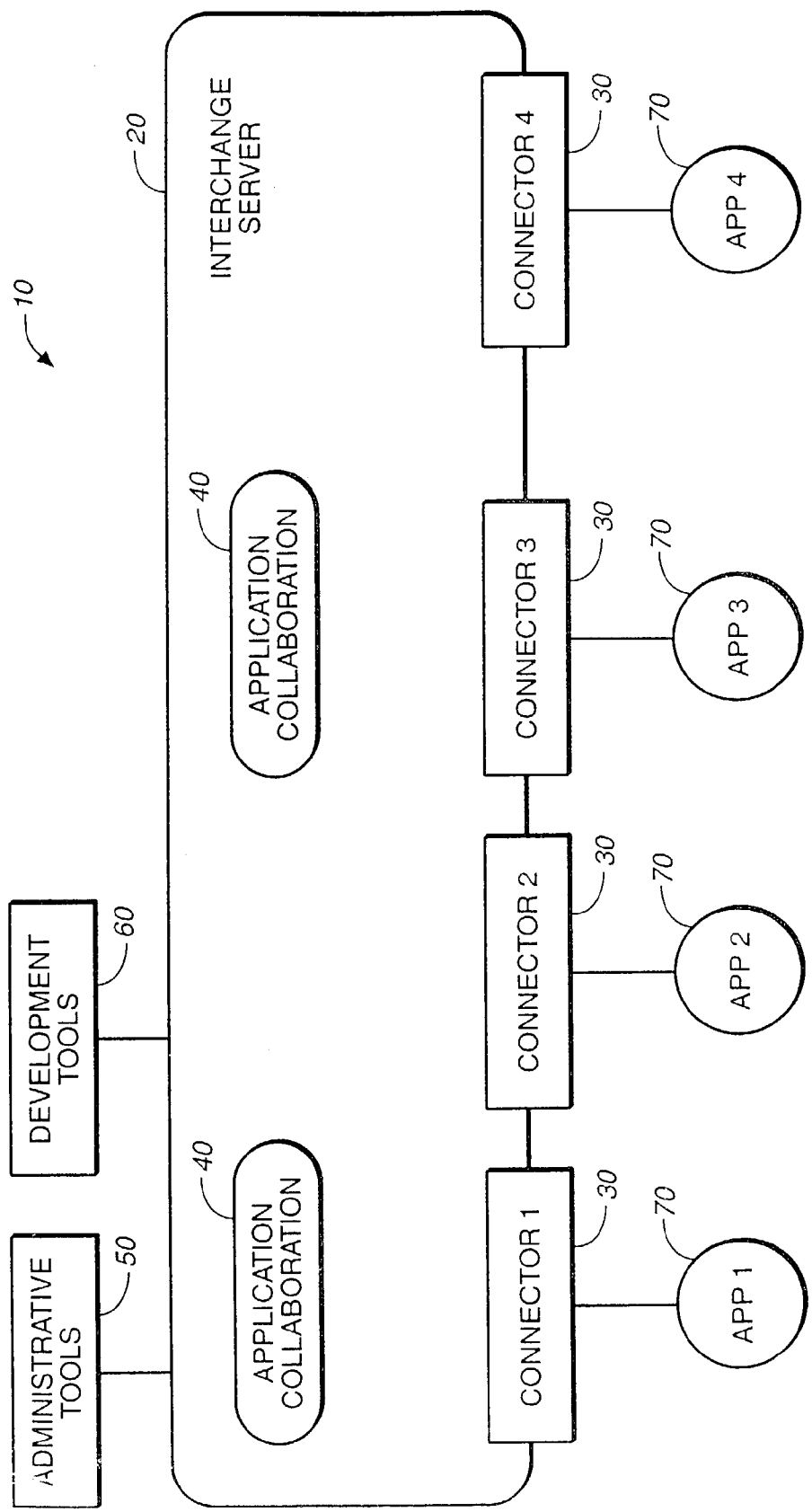
FIG._1

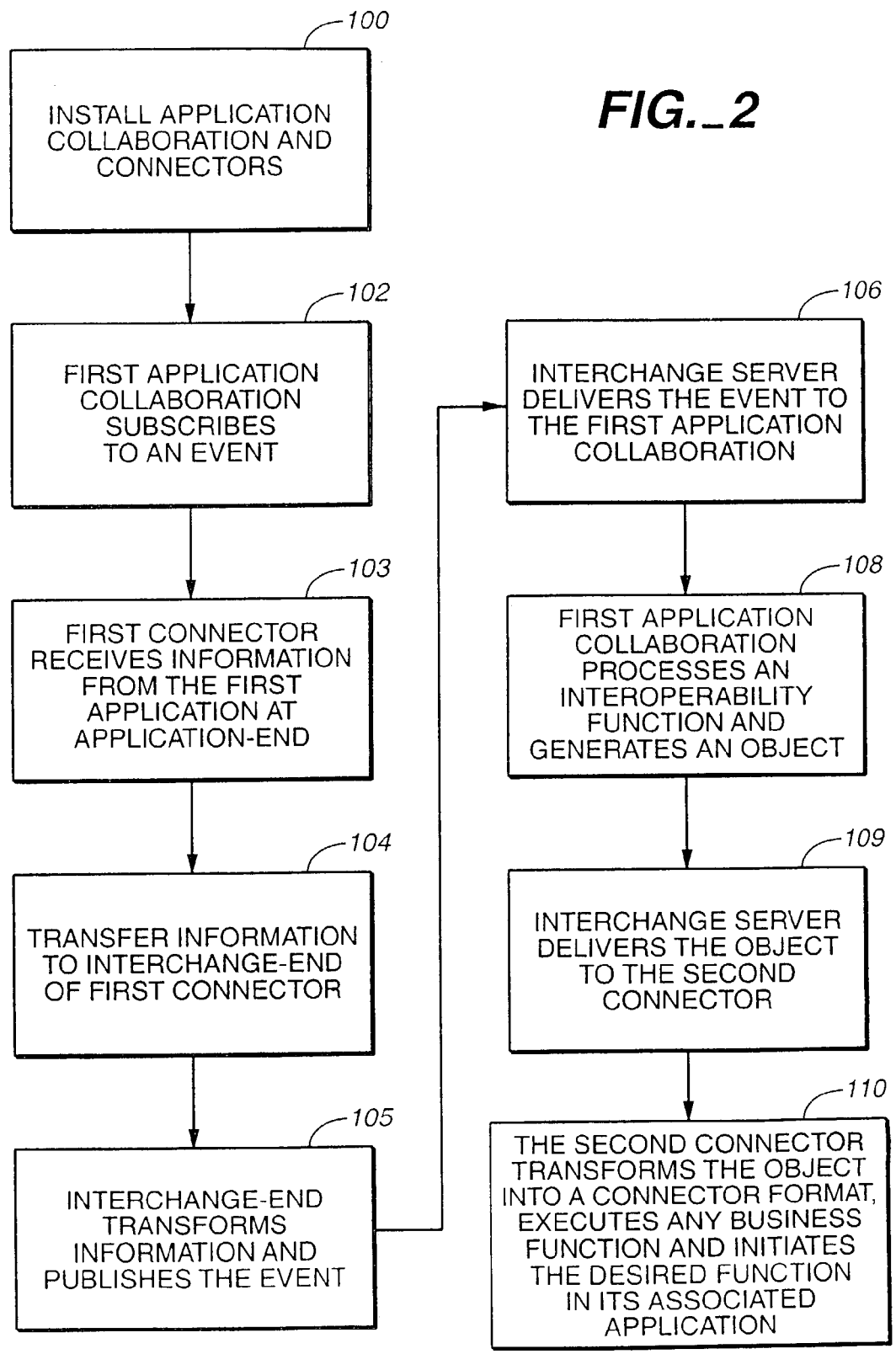

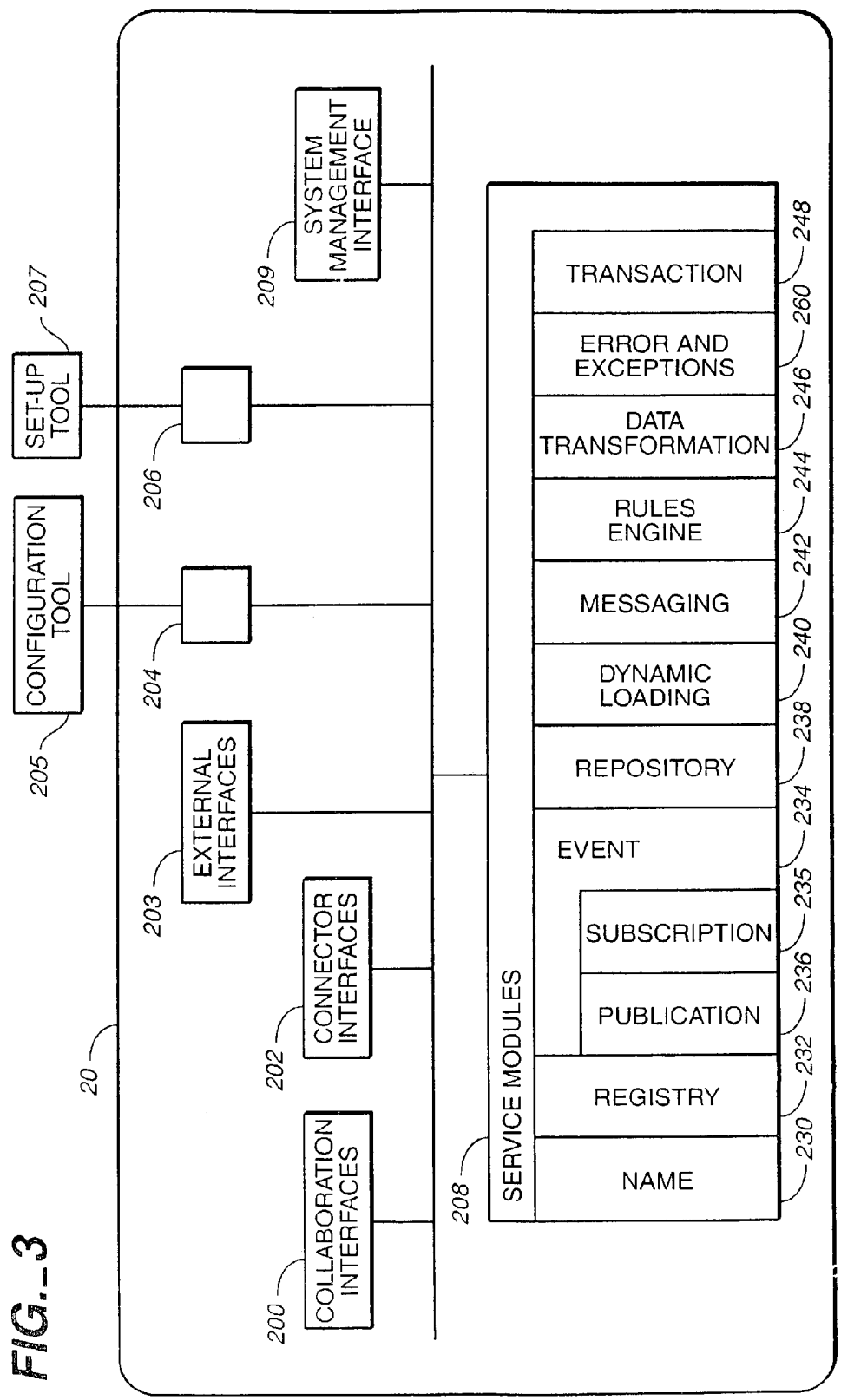
FIG._3

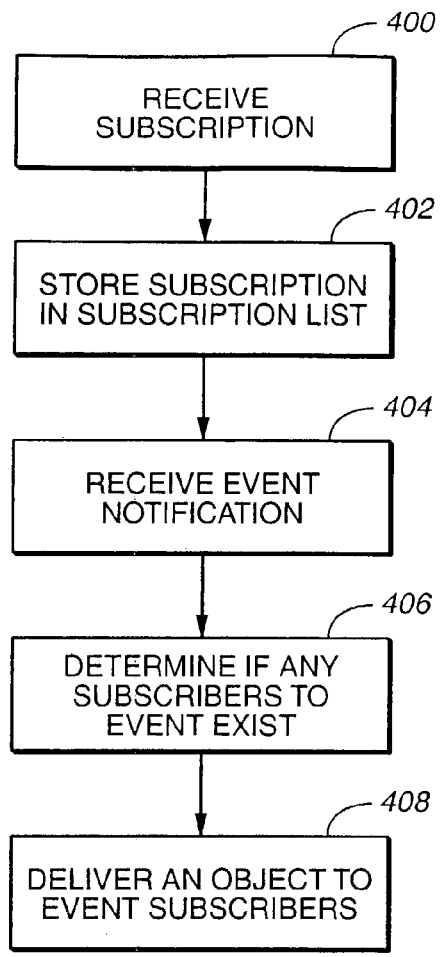
FIG._4
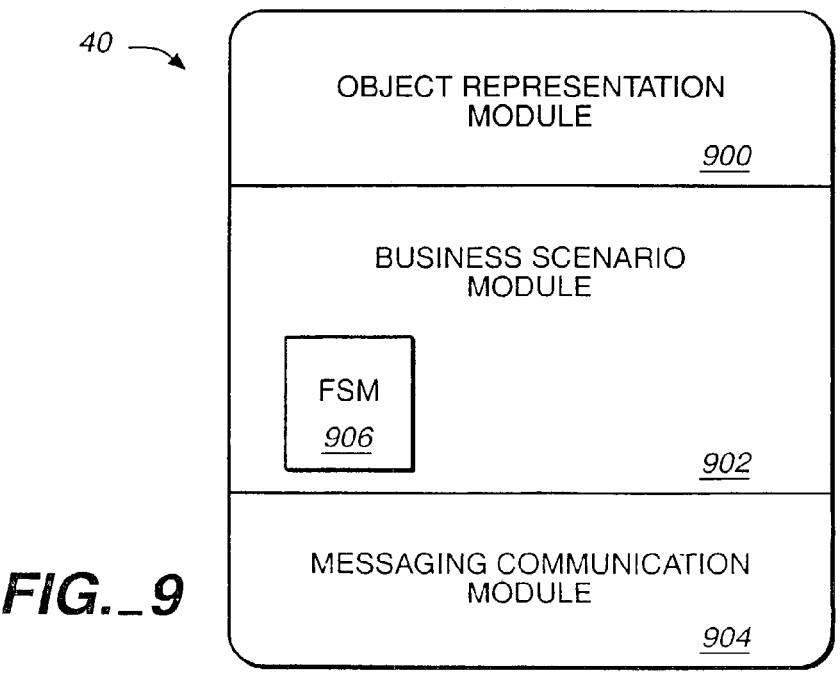
FIG._9

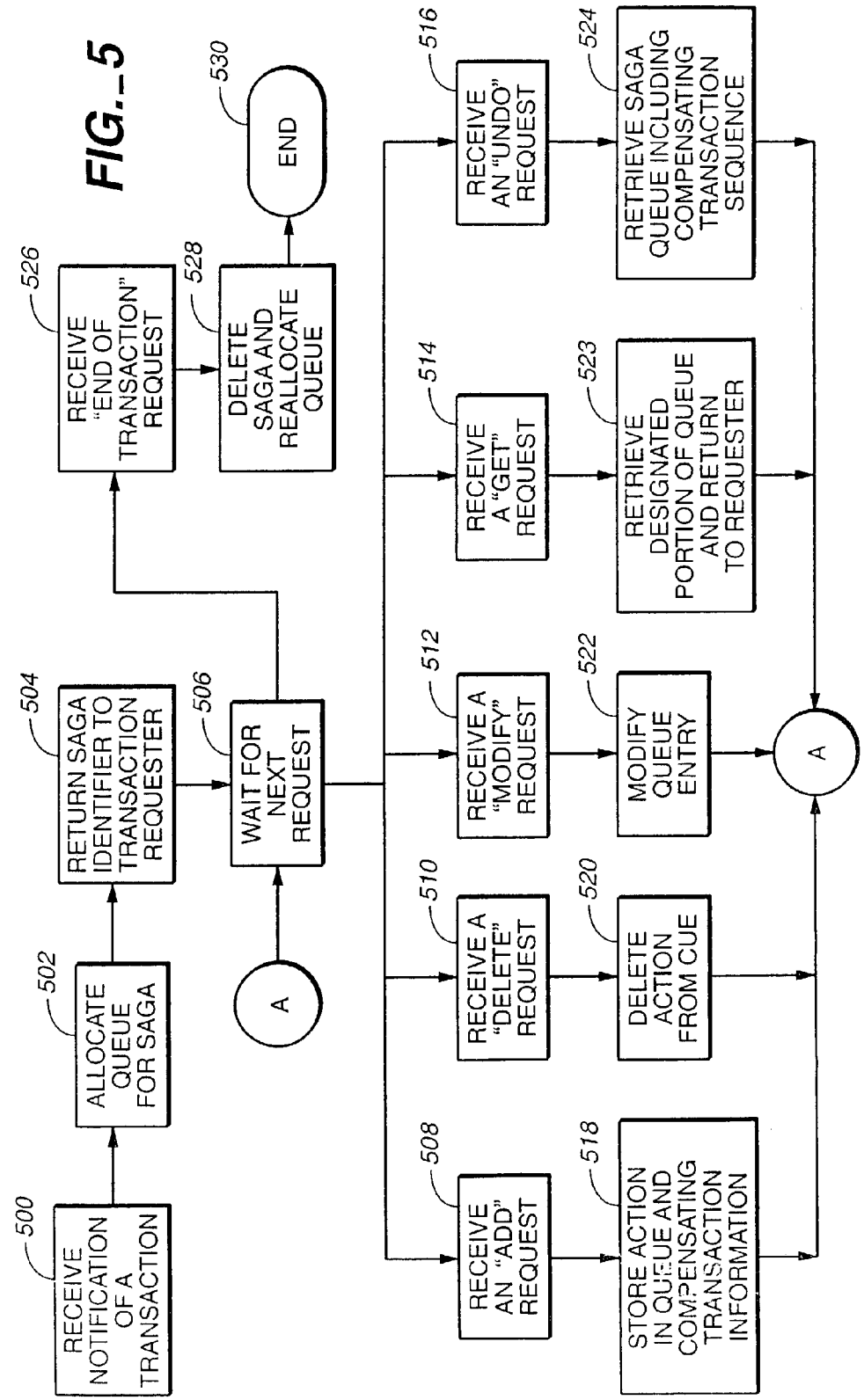

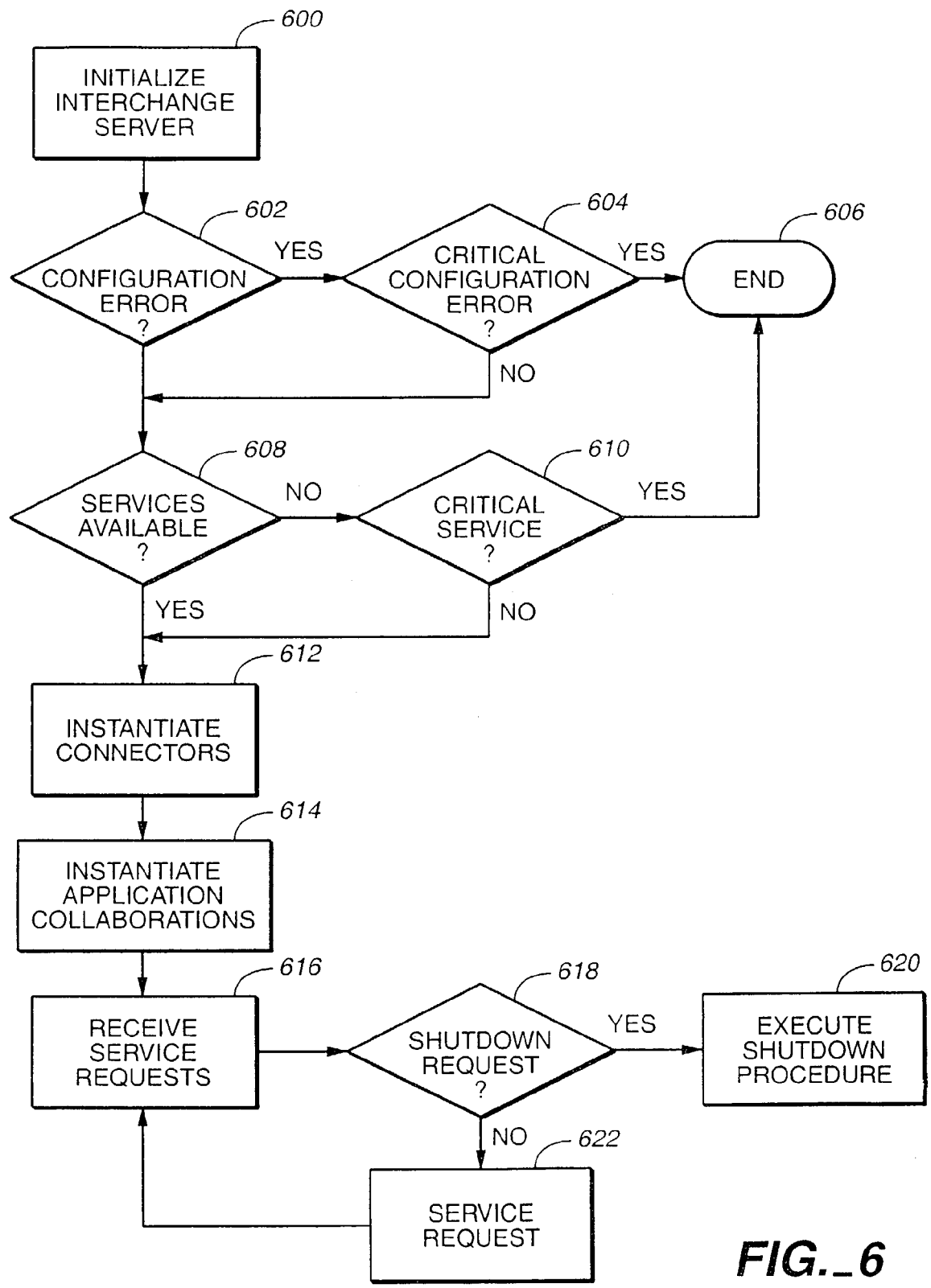
FIG._6

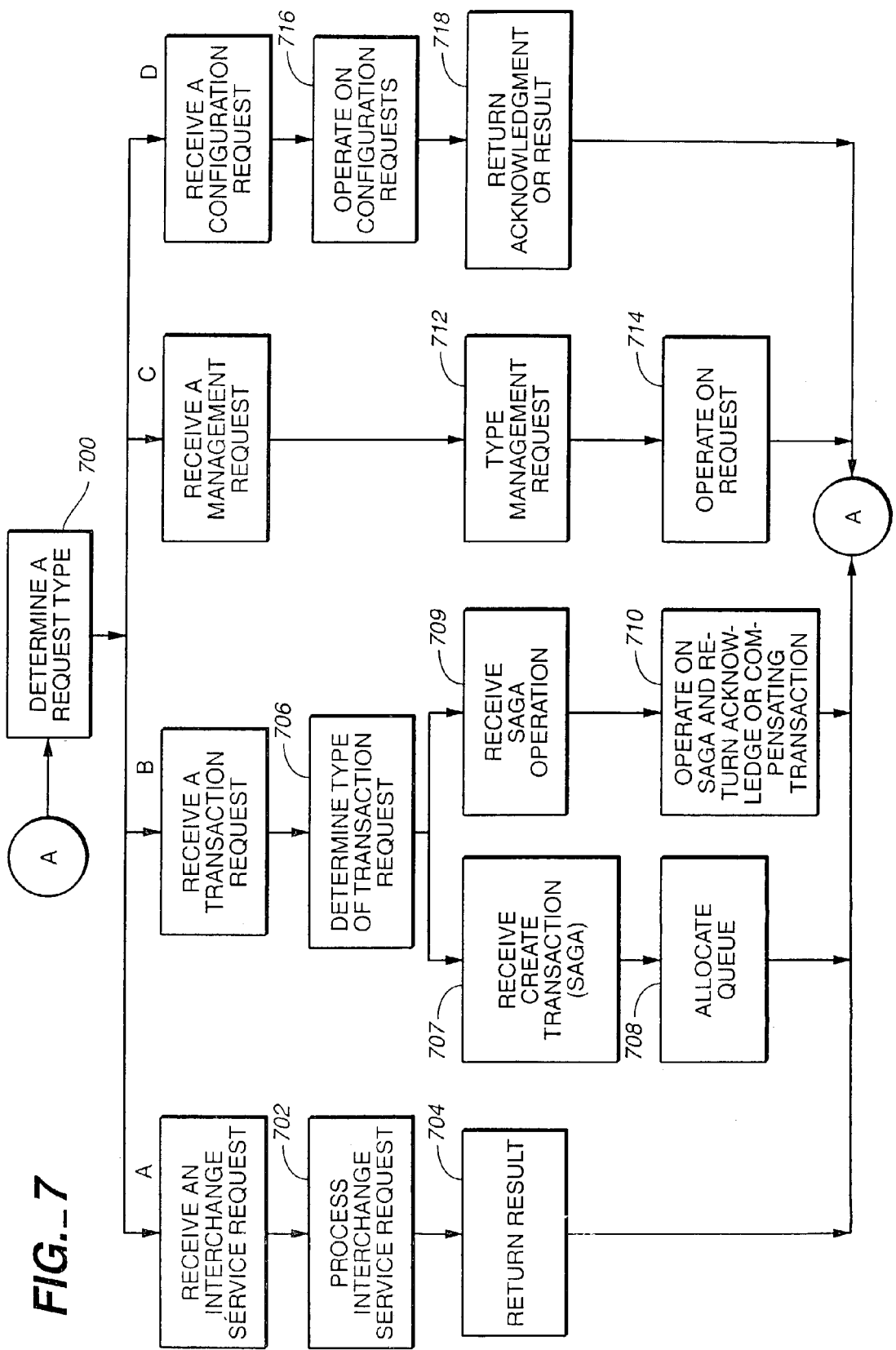
FIG._7

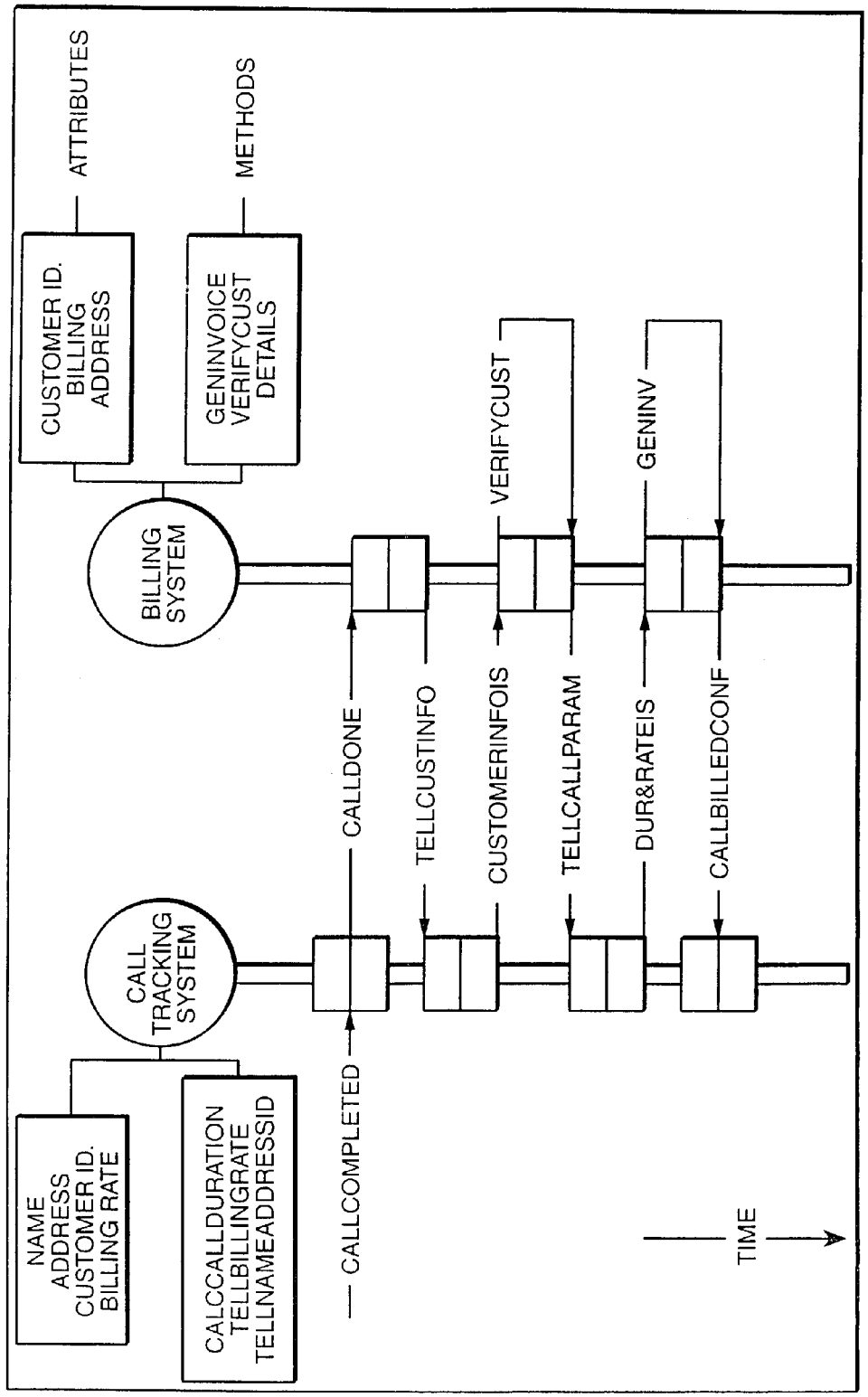
FIG._10

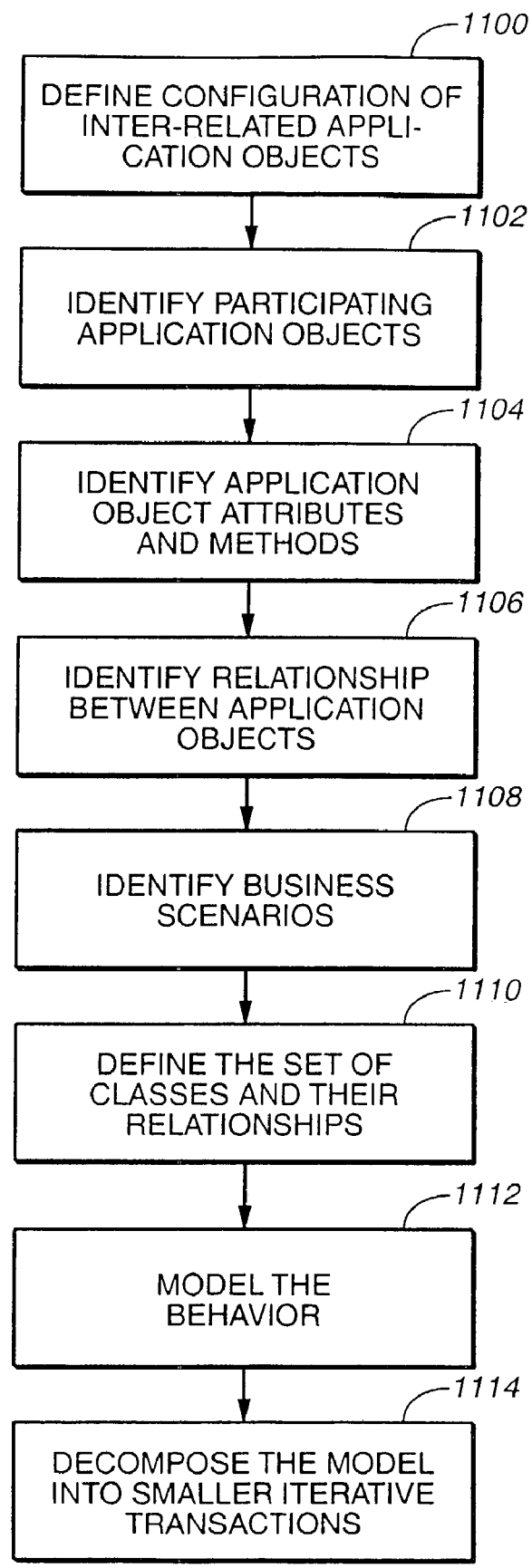
FIG._11

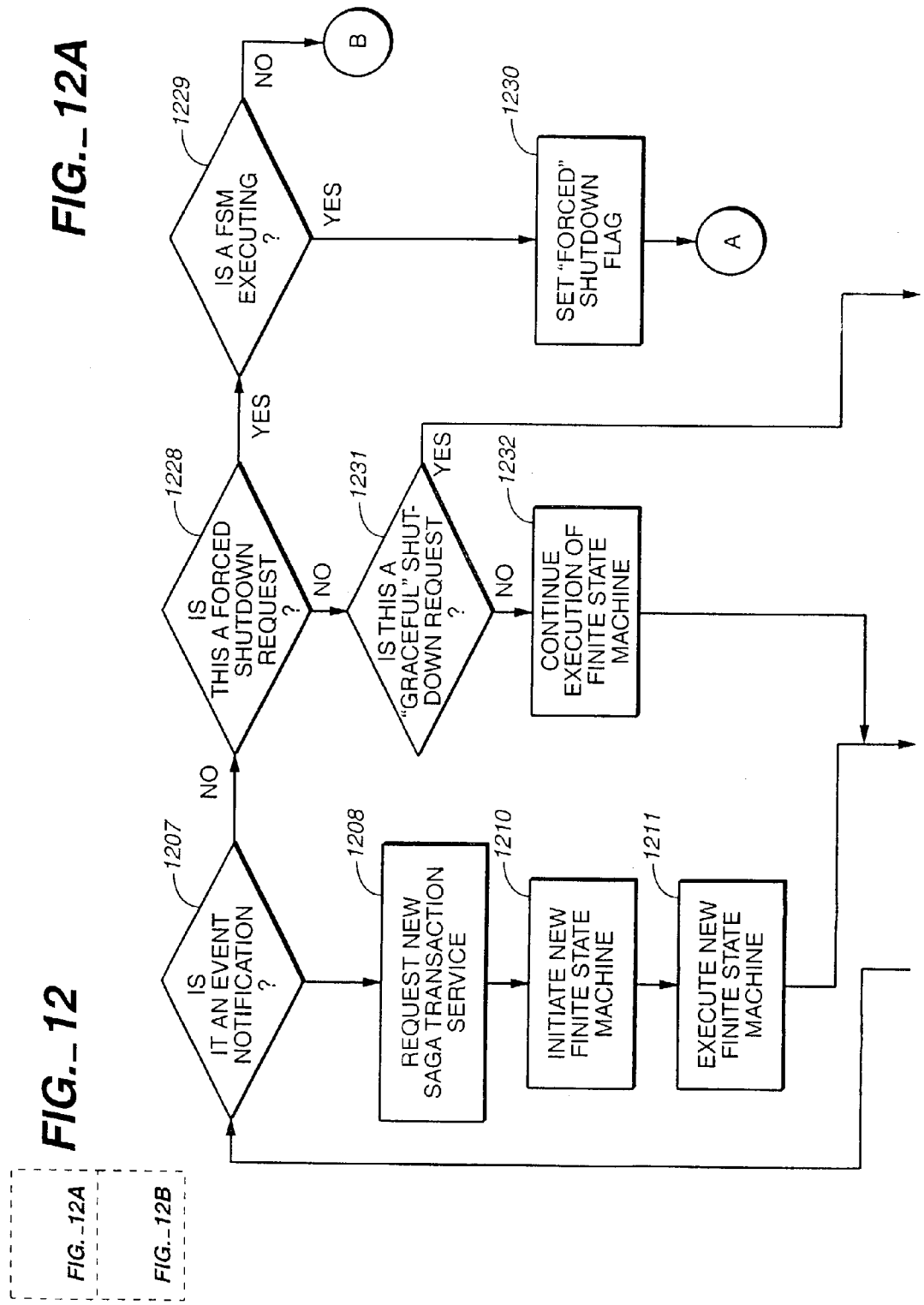

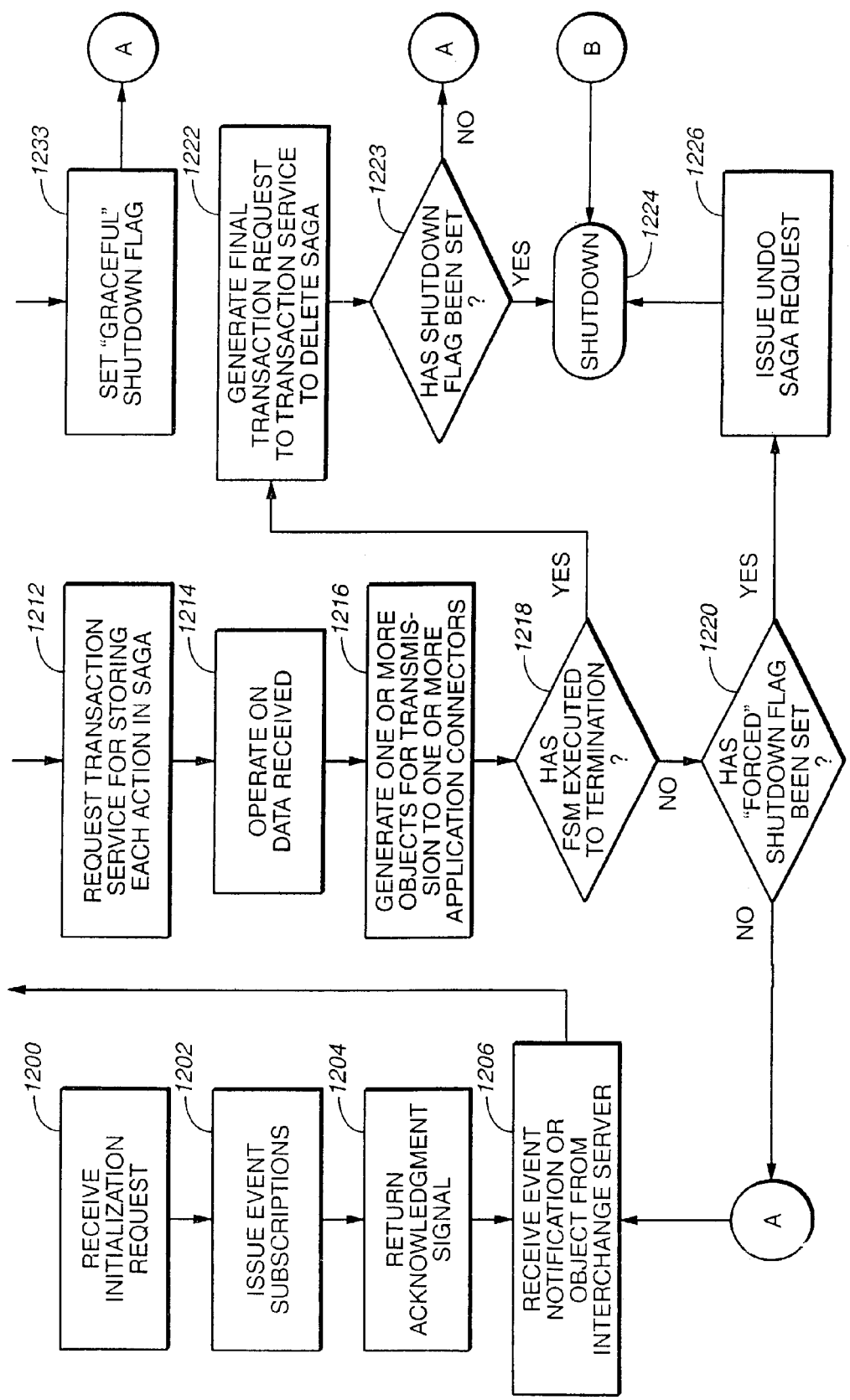
FIG._12B

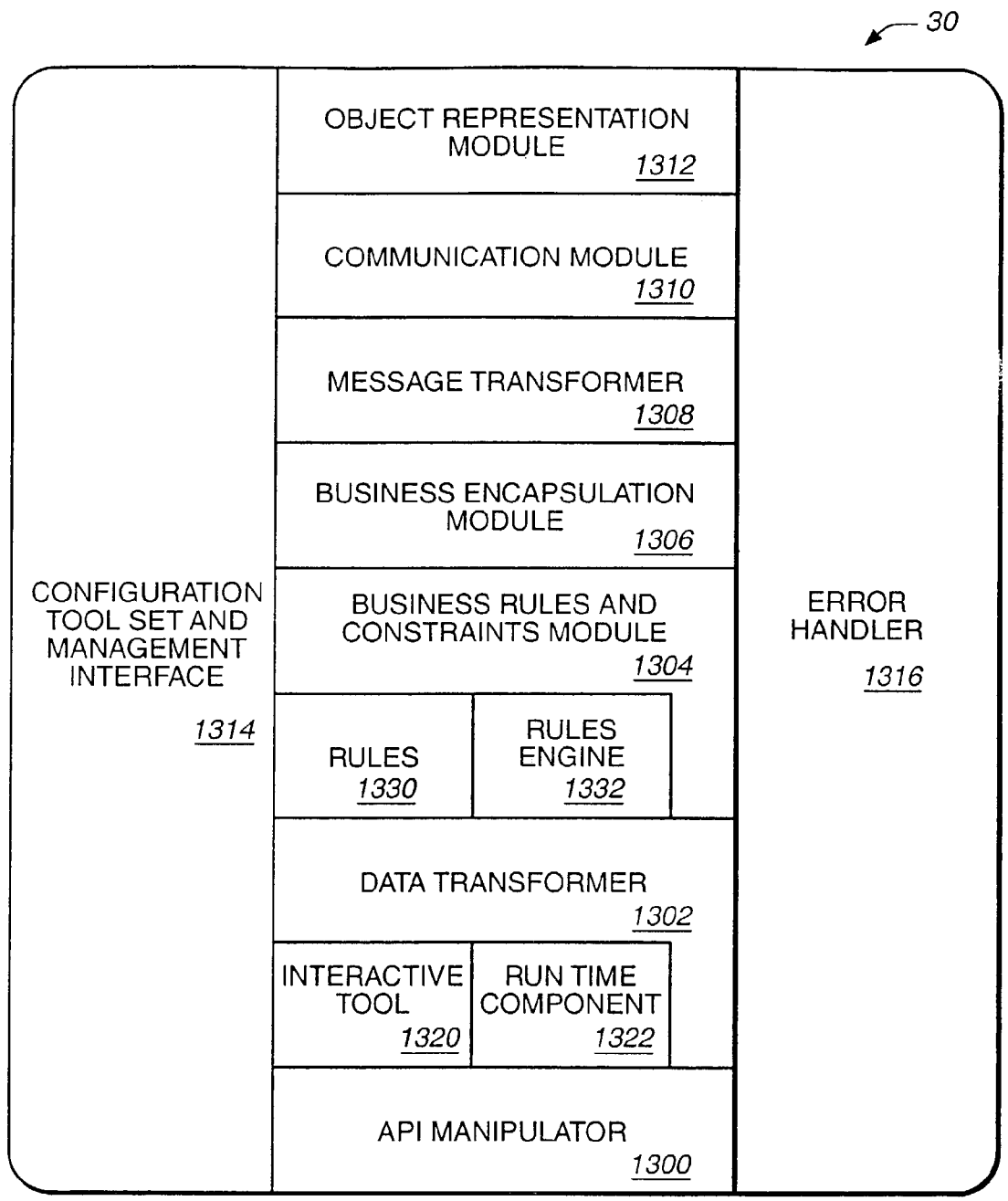
FIG._13

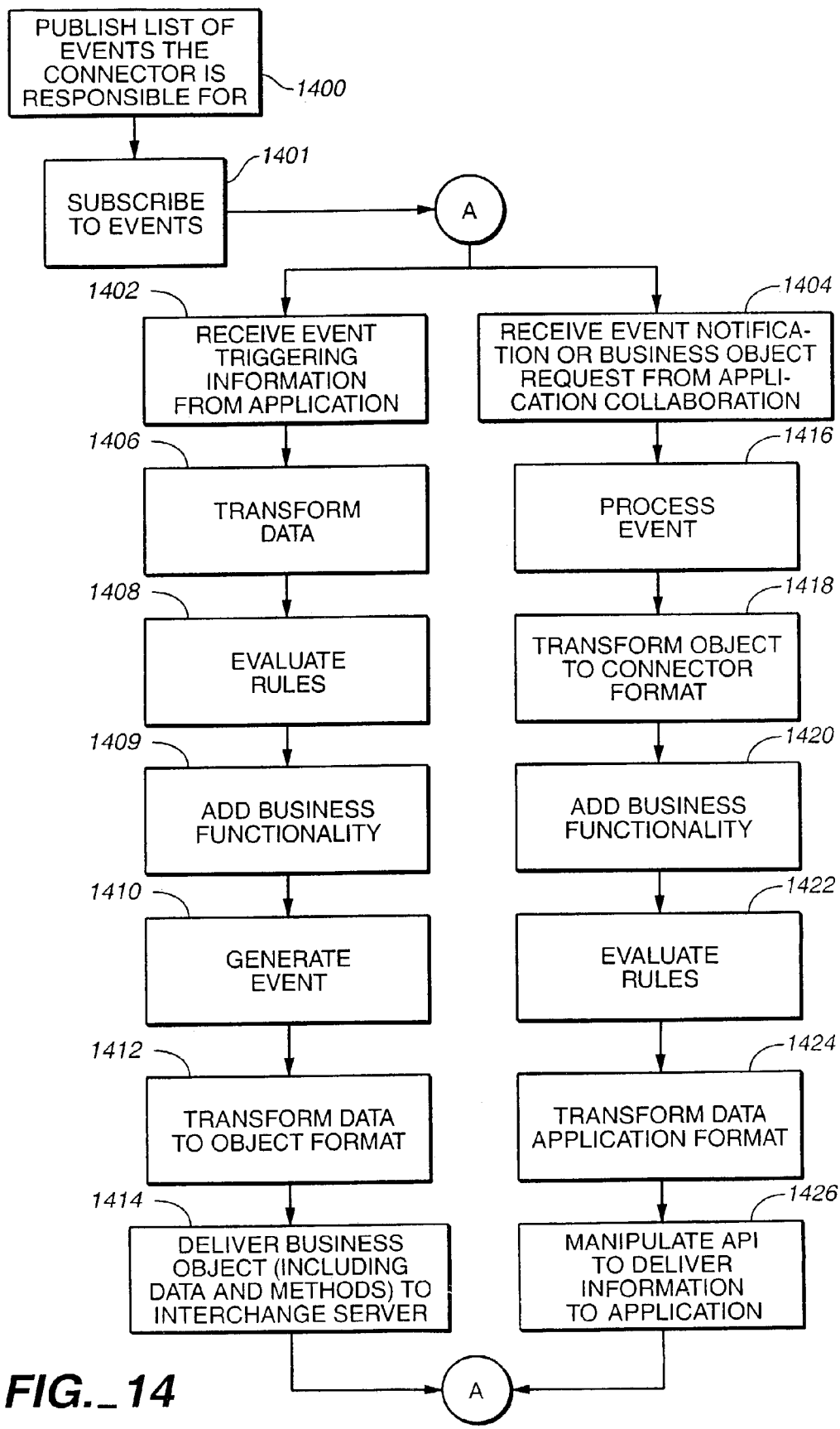
FIG._14

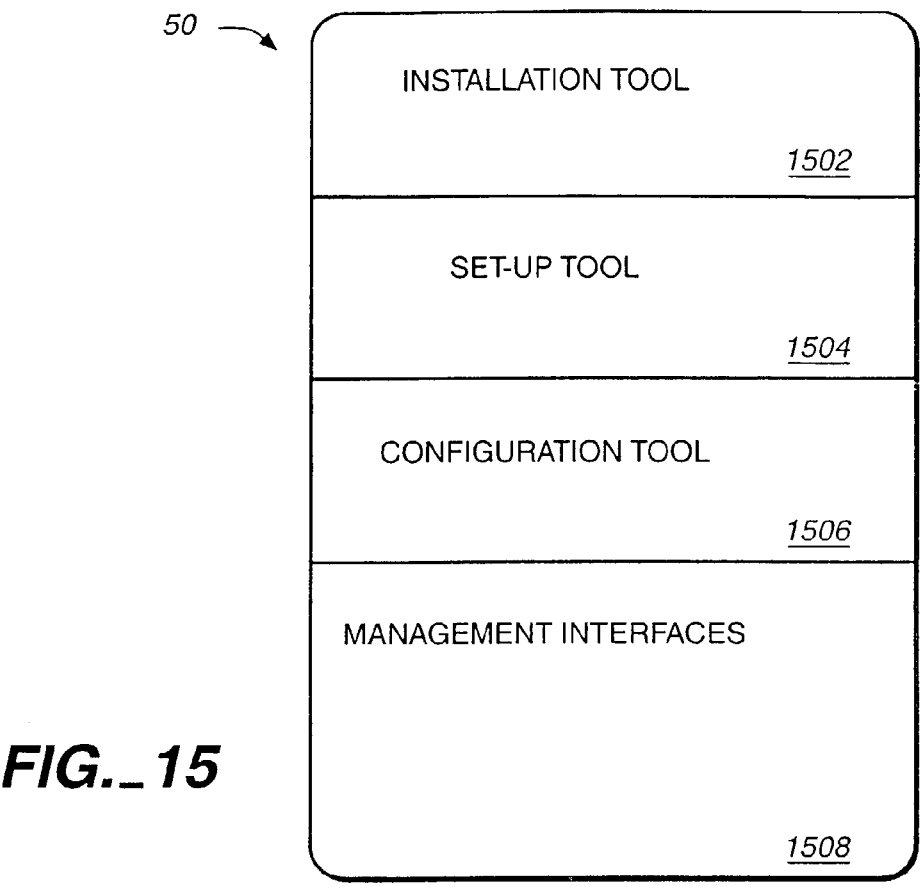
FIG._15
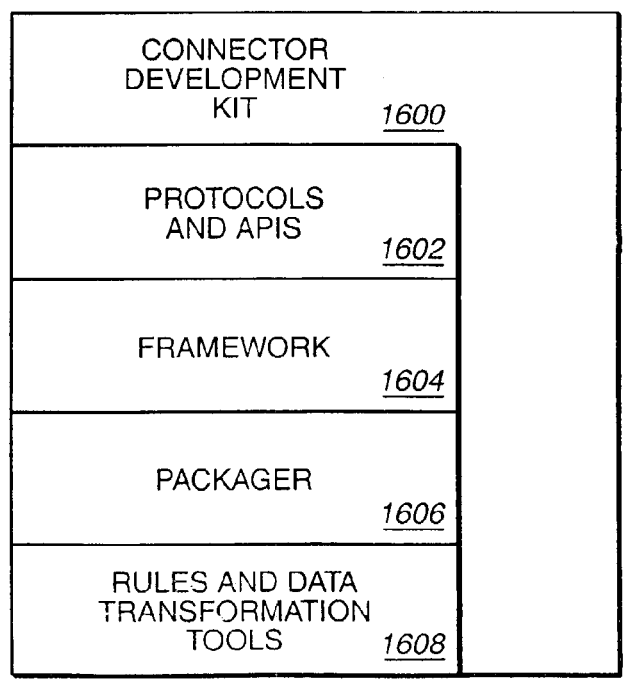
FIG._16

MODULAR APPLICATION COLLABORATOR FOR PROVIDING INTER-OPERABILITY BETWEEN APPLICATIONS AND MONITORING ERRORS TO TRIGGER EXECUTION OF REQUIRED COMPENSATING ACTIONS TO UNDO INTERRUPTED TRANSACTION

This is a continuation of Ser. No. 09/527,111 filed Mar. 16, 2000 now U.S. Pat. No. 6,507,875.

This application is a Continuation in part of application Ser. No. 08/780,593, filed Jan. 8, 1997 now U.S. Pat. No. 5,913,061.

The present invention relates generally to computing systems, and more particularly to a method and apparatus for providing collaboration between applications operating in an information system.

BACKGROUND

Corporations have spent billions of dollars a year to implement custom, standalone information systems that address specific business domain functionality requirements such as accounting, payroll, manufacturing, and distribution. By creating these separate, standalone systems, each individual section of the business process became isolated from the others.

Over time, Corporate Information Technology (CIT) departments began shifting away from in-house development of these custom systems and have attempted to minimize costs by purchasing enterprise applications on the outside. Enterprise applications are more generic, providing general business functionality in a pre-packaged product. Typically, enterprise applications include heterogeneous combinations of application systems, hardware platforms, operating systems, third- and fourth-generation languages, databases, network protocols, and management tools. While these applications bring tremendous benefits to the companies that implement them, on an enterprise level, they only exacerbate the proliferation of "process islands" because they are not readily integratable.

Stand-alone enterprise applications provide powerful tools for handling many business processes. However, some functionality is often duplicated in separate applications, driving up the cost when bundling enterprise applications. Custom functional integration between enterprise applications, while desirable, is generally cost prohibitive, and defeats the benefits of the make-versus-buy decision to purchase the enterprise application in the first place. Tool and middleware vendors offer solutions for data integration, but not function integration, and even those solutions require significant custom coding to implement.

SUMMARY OF THE INVENTION

An interchange server for coupling with a plurality of connectors comprises an application collaboration module for defining the generic portion of the inter-operability function. The application collaboration module comprises a transaction service responsive to a trigger for initiating the inter-operability function and being activated upon receipt of data from one or more connectors. The trigger and the transaction deliver data to one or more connectors for transfer to an associated application whereby the inter-operability function is realized while each application is executing independently in an unmodified state. The connectors are configured for communicating with a like plurality of applications.

Each connector includes an application interface, a business module and interchange server interface. The application interface includes an API manipulator for receiving and transferring data and methods between a connector and its associated application. The business module includes business methods and transforms for manipulating data for transfer between an associated application and an application collaboration module. The business module may include a filter mechanism for filtering events received from an application to match requests received from a collaboration. The interchange server interface allows for data transfer between a connector and an application collaboration module. The interchange server interface may include a proxy service for overseeing the execution of compensating events at the connector level.

One advantage of the invention is that it allows businesses to significantly improve efficiency and productivity by integrating related functionality.

Other advantages include efficient resource management at the collaboration level by proxy execution of compensating transactions and filtering at the source. The transaction system is not required to be burdened with overseeing the execution of compensating transactions when a fault is detected. Rollback may be initiated and execution of compensating transactions may be delegate to the connector level. In this way, each connector acts as a proxy for the transaction server for its own respective application. The transaction system may maintain overall responsibility for the rollback operation to allow for sequencing of transactions between differing applications, or may relinquish control to the individual proxies. Filtering of unwanted events at the source connector level frees up collaboration and system resources resulting in only the transfer of requested events between a given connector and a collaboration.

Other advantages and features will be apparent from the following description and claims.

BRIEF DESCRIPTION OF THE DRAWINGS

FIG. 1 is a schematic block diagram of a modular application collaborator according to one embodiment of the present invention.

FIG. 2 is a flow diagram for a simplified collaboration according to one embodiment of the present invention.

FIG. 3 is a schematic block diagram of an interchange server according to one embodiment of the present invention.

FIG. 4 is flow diagram for the operation of an event publication and subscription service according to one embodiment of the present invention.

FIG. 5 is flow diagram for the operation of a transaction service according to one embodiment of the present invention.

FIG. 6 is flow diagram for the operation of an interchange server according to one embodiment of the present invention.

FIG. 7 is a flow diagram for a service request performed by an interchange server according to one embodiment of the present invention.

FIG. 9 is a schematic block diagram of an application collaboration module according to one embodiment of the present invention.

FIG. 10 is a schematic diagram showing ordered message flows for a simple application collaboration according to one embodiment of the present invention.

FIG. 11 is flow diagram for creating an application collaboration according to one embodiment of the present invention.

FIG. 12 is a flow diagram for an application collaboration according to one embodiment of the present invention.

FIG. 13 is a schematic block diagram of a connector according to one embodiment of the present invention.

FIG. 14 is a flow diagram for the operation of a connector according to one embodiment of the present invention.

FIG. 15 is a schematic block diagram of an administrative tool according to one embodiment of the present invention.

FIG. 16 is a block diagram for a connector development kit according to one embodiment of the present invention.

DETAILED DESCRIPTION

Figure 8:
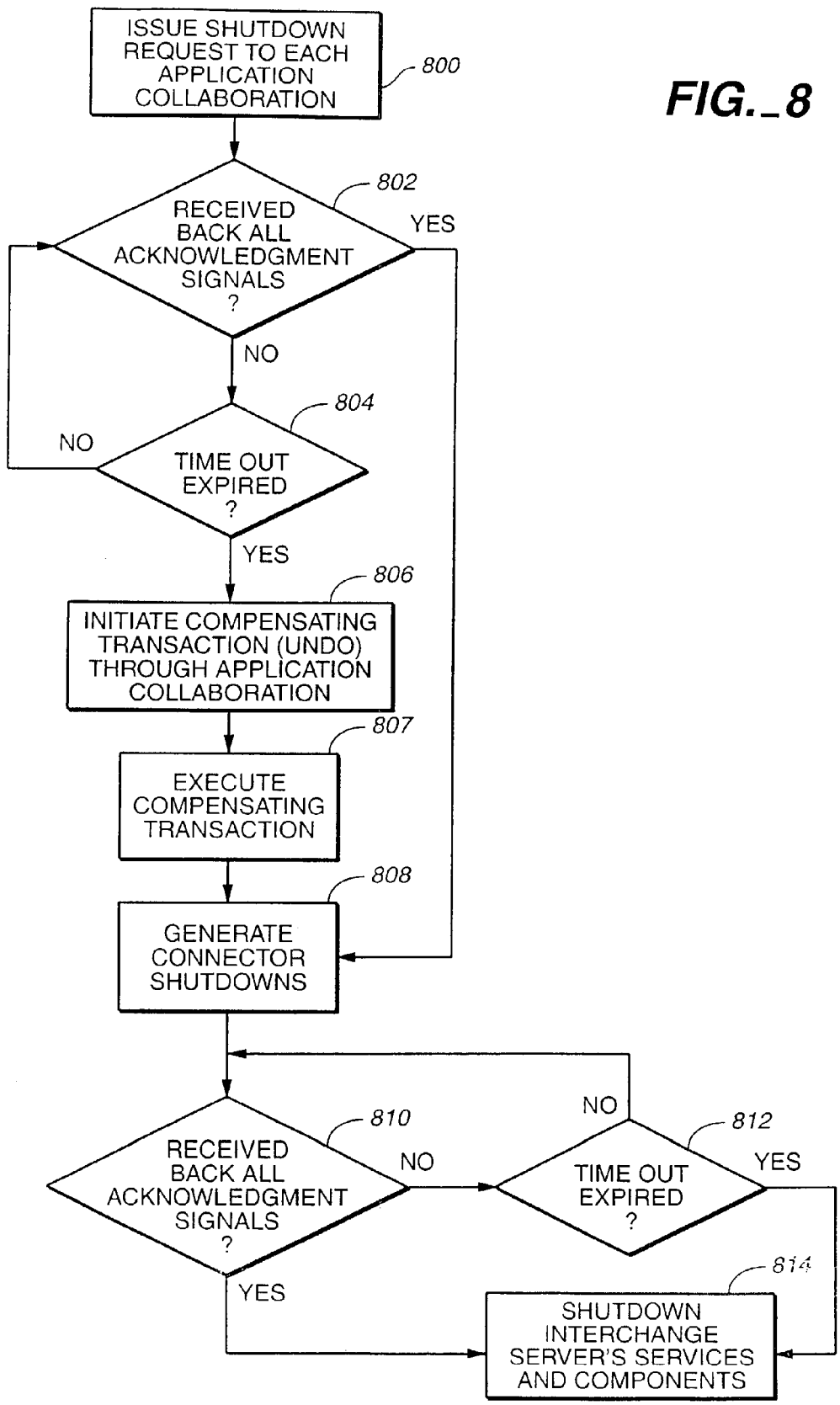
FIG. 8 is a flow diagram for a shutdown procedure for an interchange server according to one embodiment of the present invention.

Referring now to FIG. 1, the architecture for a modular application collaborator 10 includes an interchange server 20 having one or more connectors 30, and one or more application collaboration modules 40, administrative tools 50 and development tools 60. Coupled to each connector 30 is an application 70.

Interchange server 20 is a distributed application server that provides an object oriented run-time platform for all components. It also provides mechanisms to manage, configure and control components and provides all of the reliability, availability, and serviceability features (the RAS features) found in a typical server environment. An object component can reside in any interchange server within the same administrative domain. An administrative domain is a suite of interconnected connectors, application collaboration modules and interchange servers. Multiple cooperating interchange servers can run on different platforms. Platform in this case means any base software environment, including operating systems, databases (if necessary), and/or middleware.

Connectors 30 enable applications to communicate with interchange server 20. Connectors 30 handle all the details of interfacing with applications 70, and provide an object-oriented interface to represent the application in the interchange server's object and data model. Connectors 30 communicate with applications 70 and provide a schema for interacting with other applications in the interchange server's object-oriented model. Connectors can be thought of as having two ends. An "interchange-end" is an object-oriented proxy schema for the application's data and methods. An "application-end" is a driver for the application's APIs. In other words, the connector's interchange-end presents a "virtual" object interface to the interchange server for the data and methods (behavior) that reside in the application. To allow application collaboration modules to be re-used across connectors, the virtual object interface presented by the interchange-end of the connector is similar for connectors having the same application class but which are produced by different vendors. The application-end of a connector 30 is concerned with transferring information from application 70 to the virtual objects and with propagating changes (requests for change) made to the virtual objects back to application 70. The application-end of connector 30 also contains vendor specific logic required to manipulate the vendors APIs. Connectors are application and vendor-specific.

Application collaboration modules 40 provide the specific integration business logic and process flows required to integrate two or more applications 70. Application collaboration modules 40 contain the re-usable part of the integration business logic, whereas, the application specific piece of the participating business logic is stored in connectors 30. An application collaboration module 40 requires an interchange server 20 and an appropriate connector for each application 70 participating in a collaboration. Application collaboration modules 40 are specialized objects that coordinate communication and process flows between connector objects. Any application collaboration module 40 executing in the interchange server 20 will see only the interchange-end of any connector 30. Application collaboration objects implement the business interactions in terms of message exchanges between the interchange server's services (which are objects), the participating application's connector objects and other application collaboration objects.

Administrative tools 50 provide a set of tools and interfaces which allow end-user customers to install, configure, control and monitor interchange server 20 and connectors 30.

Development tools 60 provide a set of tools and libraries that allow customers to develop their own application collaboration modules and connectors. Tools are driven from meta-data in the interchange server's objects. Meta-data is a term used to describe the information which characterizes the data, and is sometimes referred to as the data definition.

Applications 70 include various business applications supporting accounting, billing, customer service, payroll and other business processes. Application clients interact with an associated application 70 using the application's user interface. Alternatively, applications 70 may be non-business applications. Inter-operability between the applications 70 is defined in an application collaboration module 40.

For example, a simplified business inter-operability function instituted in an first application collaboration module may require receiving data from a first application and writing a portion of it in a new format to a second application. A flow diagram for the simplified business inter-operability function is shown in FIG. 2. Referring now to FIGS. 1 and 2, upon initialization, the first application collaboration module 40, and its associated (first and second) connectors 30 are installed in the interchange server 20 (100). The first application collaboration module 40 provides a business inter-operability function that includes at least a trigger (e.g., the receipt of information from one or more applications) and a transaction (e.g., the writing of the new data to one or more applications) responsive to the trigger. The first application collaboration module 40 subscribes to an event based on the trigger for the particular business inter-operability function (102). In this example, the event is triggered by the receipt of information at a first connector associated with the first application (103). Based on information received from the first application, the application-end of the associated connector passes data to the interchange-end of the first connector (104). The interchange-end of first connector transforms the information into the interchange format object and publishes the event (receipt of the information or trigger) (105). The event is delivered in the form of an object generated by the first connector to the first application collaboration module that subscribed to the event (or to any application collaboration module that subscribed to the event or that requested the data) (106).

Thereafter, the first application collaboration module executes its associated business inter-operability function and generates an object for transmission to the second connector (108). The object itself is delivered to the second connector (109), which in turn transforms the object (data and methods) into the appropriate format (by the interchange-end of the associated connector) and initiates the desired function in that connector's associated application (by the application end of the connector) (110). The details associated with the collaboration process will be described further below in association with the detailed descriptions for the individual components.

Interchange Server

Referring now to FIG. 3, an interchange server within a single administrative domain can be viewed as a bus into which various system components are plugged. Interchange server 20 includes application collaboration module interfaces 200, connector interfaces 202, external interfaces 203, a configuration tool interface 204 connected to configuration tool 205, set-up tool interface 206 connected to set-up tool 207, system management interfaces 209 and a plurality of service modules 208.

Configuration tool 205 allows a user to enable and/or change application collaboration module and connector properties. Setup tool 207 installs, removes and configures application connectors in an interchange server. System management interfaces 209 support industry standard (SMS/SNMP) administration interfaces and provide a management interface to the interchange server's components. External interfaces 203 allow tools and other external agents to access and control objects within interchange server 20.

Interchange server 20 is a component-oriented object execution environment for supporting the execution needs of application connectors 30 (FIG. 1) and application collaboration modules 40 (FIG. 1). It defines a base object model of objects and components, which function as large grained container objects. Application connectors and collaborations are implemented in terms of this base model and are large grained containers within the interchange environment. This allows connectors and application collaboration modules to have powerful interfaces derived from the base model, while simultaneously encapsulating the details of their implementation within that individual component of the interchange server.

Components are large-grained objects which contain other objects and which can be loaded in via a DLL (dynamic linking and loading) at run-time. Objects and components are defined in terms of their interfaces which are strictly separated from their implementations. Components are named through a name service 230 and found in a registry 232.

Connectors are a component that acts as a proxy for an application. Connectors manage connector objects (also called virtual objects) which are typically proxies for entities within the application. Application collaboration modules are objects which live in the interchange server and can be dynamically registered or de-registered. Application collaboration modules create or manage objects as needed. An application collaboration module can be viewed as a sub-component within interchange server 20 which uses the same base object model as the interchange server. Everything in the interchange server is expressed in terms of the base object model. The base object model defines objects and the mechanisms for describing them. The base object model provides object orientation, distribution, location independence, and an ability to implement objects on the supported platforms.

Objects interact via events and messages. Event subscription service 235, event publication service 236 and messaging service 242 are the fundamental mechanisms by which application collaboration objects interact with connector objects. The interchange server 20 provides objects with "services".

The services provided by service modules 208 in interchange server 20 are those required by the connectors and application collaboration modules to carry out their integration tasks. In one embodiment of the present invention, the services are depicted as modules on a bus and include name service 230, registry service 232, event service 234 including subscription service 235 and publication service 236, repository 238, dynamic loading service 240, messaging service 242, rules engine service 244, data transformation service 246, transaction service 248 and error and exception service 260. The interchange server services include the capability to add and remove connectors and collaborations dynamically, to test new configurations, to manage resources efficiently, to allow for smooth upgrades and to recover gracefully from hardware and software failures. Interchange server services are built out of the base object model and include all the generally useful features that the interchange server's components require.

Interchange server 20 includes a registry service 232 to coordinate the interchange server's startup processing and allow objects to find other objects by name. This includes dynamic registration of new objects as they become available. Dynamic registration allows a new application collaboration module to register itself. Dynamic registration also enables other clients to locate a new collaboration when it comes online. Registry service 232 stores meta-data associated with any component in repository 238 which can be accessed by other tools in the interchange server.

Dynamic loading service 240 loads the run-time pieces of the components and executes them without having to re-compile or re-link the interchange server 20.

Event service 234 provides a publish and subscribe notification mechanism. Event service 234 de-couples information providers from information consumers. The notion here is that application collaboration objects may wish to subscribe to certain business objects/events that are published by certain connectors without knowing the intimate details about which connectors are publishing which objects. The event delivery and subscription service includes subscription receipt (for an event), storage of the subscription, receipt of an event, event notification and object transfer (result) associated with the event for each object (application collaboration module, connector, or interchange server) that subscribed to the event. The event service includes a subscription service 235, including a subscription list, and a publication service 236.

Referring to FIGS. 3 and 4, in the process of publishing and subscribing to an event, a subscription is received from an object (connectors, collaborations or interchange servers) (400). The subscription service 235 stores the subscription in a subscription list (402). Upon receipt of an event notification (404), the publication service checks the subscription list to determine if there are any objects which have registered an interest in the received event (406). If an object has subscribed to the event, then the publication service delivers an object associated with the event notification to each object in the subscription list requesting notification of the particular event (408).

Referring again to FIG. 3, messaging service 242 provides asynchronous execution semantics for geographically distributed components. Messaging service 242 includes a reliable queuing and messaging facility to allow interchange server 20 to support an asynchronous transaction model. Furthermore, the reliable delivery mechanism allows message requests to be persistently queued (in sequence) to the participating component if the participating component is unavailable. When the component starts up again, it processes any outstanding messages by getting them from the underlying persistent queues. In one embodiment, the publish and subscribe services are built on top of the messaging service to provide an event service which transcends all process, system and geographical boundaries of the participating components.

Rules engine service 244 has two aspects, a definition aspect and an execution aspect. The definition aspect ties in with the definition of a rule and the execution aspect consists of evaluating such rules during execution. Application collaboration modules use this service for defining and evaluating the business rules that are enforced within the application collaboration module. Connectors also use this service when evaluating business conditions or defining new business logic within the connector. Lastly, event service 234 may use rules engine service 244 to evaluate semantic content of a message for message routing and also for publication.

Data transformation service 246 is provided to perform both syntactic and semantic transformation of data. Examples of such transformations range from simple integer to character conversions to transforming the semantic content and meaning of a term during a collaboration. For example, a requirement to provide such a semantic transformation arises if "employee" in a first application has associated with it two fields (employee identification number (8 bits) and name), while "employee" in a second application has associated with it three fields (employee identification number (10 bits), name and social security number). When transferring employee data from the first application to the second, two transformations might be used to synchronize the two systems. One transformation would be required to map employee number (8 digit to 10 digit) and a second transformation would be required to extract an employee's social security number from the first application's database and add that information into the second application's system. Typically the targets for the transformations are defined by the application collaboration module and the transformations performed in the connector. Connectors may also define transformations within their execution context, if necessary.

Transaction service 248 provides consistency across applications linked through the interchange server. Interchange server 20 provides a transaction model for supporting discrete asynchronous transactions with compensating transactions. A compensating transaction is a transaction that can semantically undo the effects of a previous transaction. Transaction service 248 includes one or more queues 249 (not shown), and message processor 250 (not shown) for implementing asynchronous transactions. Transaction service 248 provides consistency across applications in two ways. Store and forward queues manage transactions destined for applications that are not on line. Secondarily, transaction record queues are used to record transaction actions. The transaction record queues are used to recover from transactions that are interrupted, so as to re-establish the state of the system prior to the execution of the first action associated with an interrupted transaction.

In one embodiment, sagas are used to maintain consistency and recover from failures or other shutdowns received in the middle of executing a transaction. A "saga" is a doubly linked list of connected discrete transactions that consists of a set of steps (or sub-transactions) and compensating sub-transactions. To guarantee consistency, the present invention assures that either all the sub-transactions in a saga are completed or any partial execution is undone with compensating sub-transactions. Each sub-transaction in a saga does not assume the same consistent state. Therefore, once a sub-transaction is complete, it can be committed without waiting for other sub-transactions of the same saga and thus release its results to the rest of the concurrent transactions. In case of an interruption, an application collaboration module can attempt both forward or backward recovery of an interrupted transaction. Compensating transactions will be discussed in more detail in association with the error and exception service 260.

Referring now to FIGS. 3 and 5, in a method of maintaining consistency in the interchange server, transaction service receives a notification that a transaction is to be initiated by an object, such as an application collaboration module in response to a event notification (500). When an application collaboration module receives notice of an event, it initiates a saga initiation transaction request (or for that matter when any object in the interchange server initiates a transaction). Transaction service 248 responds to the saga initiation request by allocating a recording queue to store the actions associated with the transaction initiated by the application collaboration module (502). The transaction service 248 returns a saga identifier associated with the recording queue to the object initiating the transaction request (504).

Thereafter, the application collaboration module executes steps/actions according to its business inter-operability function. As each action (also called transaction step) is initiated, the application collaboration module generates a request for adding the step in the appropriate saga queue. The transaction service enters a loop and waits for the next request from the requesting object (506). The types of requests that can be received are add (508), delete (510), modify (512), get (514), undo (516) and end transaction (526).

If the next request is an "add" request, then the action associated with the "add" request is stored in the recording queue along with compensating transaction information (518). If the next request is a "delete" request, then the requested entry (action) from the queue is deleted (520). If the next request is a "modify" request, then an entry in the queue is modified according to the request (522). If the next request is a "get" request then the designated portions of the queue (saga) are returned to the requesting object (523). Finally, if the next request is a undo request, a compensating transaction sequence associated with the actions stored in the queue is retrieved from saga and initiated (524). At the completion of a transaction (upon receipt of an end transaction request), the saga is removed (526–530).

In one embodiment, in the event a transaction is interrupted, a compensating engine within the transaction service executes compensating actions to undo the saga stored in the recording queue associated with the partially completed transaction. Aborting a transaction is accomplished by executing a corresponding compensating transaction for each action (sub-transaction) in the saga queue. The compensating transactions provide a logical or semantic "rollback" (since the transaction has already committed). For example, the compensating transaction for "add employee" may be "remove employee". However, the compensating transaction may not be so simple. For example, a human resources user may be mystified if a new employee simply disappeared from the system because some project tracking system, possibly located in another department in another location, rejected it. Accordingly, other more complicated compensating transactions are defined.

In an alternative embodiment, the transaction service within the interchange server does not execute compensating transactions. Upon detection of a fault during the execution of a transaction resulting in the need to roll back or roll forward as described above, the compensating transactions stored in the saga record queues may be forwarded to individual connectors associated with the applications that are a party to the transaction. Each connector in turn may be tasked to execute the compensating transaction. Resources within the interchange server are not required to be tied up overseeing the execution of compensating transactions. Instead, each connector acts as a proxy for executing the appropriate compensating actions to undo the transaction. The connector logs into the application via the API to initiate the particular undo transaction. Transactional consistency is effectively decentralized by delegating and enforcing at the connector level.

The transaction service is used to transfer compensating transactions to the connectors in the order of execution required to undo a transaction. The timing for when compensating transactions are transferred and the form by which they are transferred may vary. More specifically, the storage of compensating transactions may be decentralized such that the transaction service is not required to pass compensating transactions to the connectors after a fault is detected. As each transaction event is transferred to a connector (in response to receipt of a trigger), compensating transaction information may be implicitly or explicitly included for that particular transaction. When a fault arises, the connectors can execute compensating transactions when prompted by the transaction system. Control for the timing of the execution of compensating transactions may remain in the transaction service.

As described above, compensating transactions may be explicitly or implicitly provided with each transaction processed by a given connector. If the compensating transactions are explicitly provided, a queue system may be included in the connector to store explicit compensating transactions. Alternatively, in an implicit system, each connector is configured to associate a default compensating transaction with each transaction that is processed by the connector. Default compensating transactions may be hard-coded in the connector or may be downloaded at initialization of the connector.

Note that compensating transaction information may be transferred to more than one connector depending on the complexity of the undo requirement for a given transaction. At the time a fault is detected, the transaction service may initiate recovery by indicating to the respective connectors which actions (subtransactions) are to be undone. As described above, the transaction system may pass the compensating transactions directly to the connectors after a fault is detected, or the transaction system may merely indicate which transactions are to be undone (assuming compensating transactions have been implicitly or explicitly identified for each transaction processed by the connector).

Alternatively, the transaction system may relinquish control of the roll back and roll forward operations by instructing a connector to undo a sequence of transactions. For example, the ordering of the undo operations at the connector level may be immaterial. In these types of rollback situations, the transaction system may delegate the entire rollback operation to the connector level. The transaction system may instruct each connector to rollback all actions (subtransactions) associated with a particular transaction. Thus, transaction compensation can be executed with the use of minimal transaction system resources. The use of a proxy service at the connector level to execute compensating transactions is described in greater detail below in association with FIG. 13.

In one embodiment, a 2PC (Two Phase Commit) coordinator is used to coordinate the queuing of messages to multiple queues participating in the application collaboration. When a single collaboration provides the underlying messaging service to send messages to 5 applications, the two phase commit coordinator guarantees that either all the 5 messages will be transmitted or none of the messages is transmitted.

Providing asynchronous transactional semantics in a connector involves identifying transactional objects, its transactional methods and providing the necessary functions (compensating transactions) to compensate for these methods. The content of compensating transaction functions is collaboration specific implying that the processing logic could be different for each method. In most cases, hand-coding the compensating transactions will be required. In one embodiment, the interchange server is able to dynamically enable and disable the execution of the compensating transaction functions in any connector.

Error and exception service 260 provides notifications and hooks to handle errors. Error and exception service 260 provides a notification of any error identifying the component where the error occurred, location of such component, the nature of the error in the form of an error number and string. In the event a transaction is interrupted, the error service issues a undo request to the transaction service to initiate the "undo" actions stored in saga. Alternatively, the error and exception service may notify the appropriate application collaboration module of the error. The application collaboration module may thereafter attempt both forward or backward recovery of an interrupted transaction. In a backward recovery, the application collaboration module issues an undo request to the transaction service to undo any transaction steps completed in the interrupted transaction. Alternatively, a forward recovery seeks to continue the interrupted transaction by evaluating the particular error and deciding if it is critical. If not, a work-around is employed.

The exception service allows users of the service to register resources which can be de-registered easily in case of exceptions in processing.

Other services may be provided by interchange server 20 including: a timer service, to let connectors and application collaboration modules have pre-defined schedules for executing certain operations; thread and synchronization service, to allow many operations in the interchange server to be executed in parallel; licensing service; persistency service, to allow for persistently storing objects or object state outside that of an application; interface versioning service, to detect changed versions of the components interfaces; component versioning service, for detection of changed components, such as connectors which are upgraded or downgraded; other RAS feature services including upgrading, reporting and diagnosing bugs, performance monitoring and tuning.

In one embodiment, interchange server 20 (and application collaboration modules) are constructed in Java because of its cross-platform capability of execution. In one embodiment, the backbone of interchange server is a CORBA Object Request Broker (ORB) written in Java, produced by Visigenic, Co., Foster City, Calif., USA. The ORB operates in a Java run-time environment. The necessary CORBA services are utilized from Java (using the IDL to Java generation, consisting of Java stubs for the client and Java skeletons for the server). Communication transport in this scheme amongst interchange servers is IIOP (Internet inter orb protocol) or messaging. The communication scheme between the two halves of the connectors or between interchange servers and connectors can be IIOP or messaging.

A process flow for interchange server 20 is shown in FIG. 6. Referring now to FIGS. 3 and 6, at start-up, the interchange server is initialized (600). The initialization includes retrieving configuration information from the repository associated with registry service 232 including application collaboration module and connector information as well as interchange services information. Thereafter a check is made to determine if an error arose in the configuration (602). An error may arise if there are configuration errors in a connector or application collaboration module specification or if some service has invalid and unsupported options specified. If a critical error occurs (604), such as messaging service not available, then the initialization halts (606).

If no error is detected or if the error is not critical (for example, connector not having specified some properties but has defaults), then a check is made to determine if all of the service in interchange server are available (608). If any critical services are unavailable (610), then the initialization terminates. Else, the interchange server instantiates each installed and configured connector (612) and application collaboration module (614). Thereafter, the interchange server enters a steady state loop waiting for service requests. Upon receipt of a service request (616), the interchange server checks to determine if the request is a shutdown request (618).

If so, the interchange server executes a shutdown procedure (620). If not, the interchange server services the request (622), and then idles until the next request for service is received.

The servicing of requests is shown in more detail in FIG. 7. A request type is determined (700). If the request is an interchange service request branch A is invoked. If the request is a transaction request branch B is invoked. If the request is a management request branch C is invoked. Finally, if the request is a configuration request branch D is invoked.

In branch A, interchange service requests are processed by the appropriate interchange server service module in the interchange server (702) and a result is returned (704). For example, the request may be in the form of an event notification. The event notification is received by the event service and thereafter an object is distributed to each object (application collaboration module, connector or other interchange server) which subscribed to the particular event notification received.

In branch B, the type of the transaction request is determined (706). In one embodiment, the transaction types include a create transaction saga (for creating a transaction saga queue), and saga operations (add, delete, return, or undo saga). If the request is a create transaction saga (707), the transaction service allocates a recording queue for the new transaction and returns an identifier for the saga (708). Alternatively, if the transaction received is a saga operation (709), the transaction service operates on the existing saga, and returns either an acknowledgment of the operation or executes a compensating transaction in response to an undo request (710).

In branch C, management requests are typed (712), and thereafter operated on by the appropriate service (for example by the error and exception service) (714). In one embodiment, the management requests include the logging of errors; starting, stopping, and passing of objects in the interchange server domain; performance data collection; and, event logging and diagnosis. Management requests can be generated by objects within the interchange server or from a system management tool through the system management interface 209 (FIG. 3).

In branch D, configuration requests are operated on by the configuration service. Configuration requests can be generated by connectors, collaborations, interchange server objects or by the configuration tool. Configuration requests include the installation or removal of application collaboration modules and connectors; activation or deactivation of connectors or application collaboration modules; and version tracking and upgrade functions. The configuration service executes the configuration request (716) and returns an acknowledgment (or result) to the requesting object (or user) (718). Thereafter, the process continues at step 622 (FIG. 6), waiting for the next request for service.

Referring now to FIGS. 3 and 8, the shutdown process (step 620 in FIG. 6) includes issuing shutdown requests to each application collaboration module (800). A check is made to determine if acknowledgment signals to the shutdown requests issued in step 800 have been received (802). Each collaboration responds to a shutdown request by executing its own shutdown procedure. As part of this execution an acknowledgment signal is returned to interchange server 20. If an acknowledgment signal has not been received, then a check is made to determine if a time out has expired (804). In one embodiment, the time out is set to allow for the orderly shutdown of each component. A long time out allows for the completion of tasks. If a time out is selected that is too short, some transactions executing in a component may be terminated prior to completion of a entire transaction, necessitating the execution of compensating transactions. Alternatively, the time out can be set to a short time period to force an immediate shutdown of the system.

If the time out has yet to expire, the interchange server waits until the receipt of the last acknowledgment or the expiration of the shortest timeout.

If the time out expires, interchange server (through the application collaboration module) initiates an undo transaction for servicing by the transaction service 248 (806). Thereafter, the transaction service executes the compensating transactions required to maintain consistency in the interchange server (807).

Upon receipt of the last acknowledgment or the completion of the last compensating transaction, interchange server 20 generates a connector shutdown for each instantiated connector (808). Each connector responds to a shutdown request by executing its own shutdown procedure. As part of this execution, an acknowledgment signal is returned to interchange server 20. A check is made to determine if all the acknowledgment signals have been received (810). If an acknowledgment signal has not been received, then a check is made to determine if a time out has expired (812). In one embodiment, the time out is set to allow for the orderly shutdown of each connector. If the time out has yet to expire, the interchange server waits until the receipt of the last acknowledgment or the expiration of the shortest timeout.

If the time out expires or upon receipt of the last acknowledgment signal, interchange server initiates an orderly shutdown of its own services and components (814).

Application Collaboration Modules

Typically, application integration is achieved through the "cooperation" of one application's objects with another application's objects. In the interchange server, application objects are represented as virtual objects by their respective connectors. These business virtual objects cooperate with other business virtual objects (from another application) and utilize facilities of "service" objects to perform the application integration function. This cooperation or interaction amongst the various application objects defines and captures the application integration semantics and is encapsulated and stored in the form of an application collaboration module in the interchange server. All multi-object application collaboration modules are stored and treated as a first class entity in the interchange server and are referred to as an application collaboration object. The application collaboration object encapsulates the business logic and business process flow required to perform application integration.

Referring now to FIGS. 1, 3 and 9, an application collaboration module 40 includes a object representation module 900, a business scenario module 902, and messaging communication module 904.

Application collaboration module 40 resides as an application collaboration object in interchange server 20. An application collaboration object identifies all participating interchange (connector and "service") objects and the "business scenarios" amongst these objects.

Object representation module 900 includes methods associated with the application collaboration object including consume methods, receive methods and object generation methods. This module also defines the abstracted re-usable classes and methods that are needed to participate in a given collaboration.

Messaging communication module 904 processes event notifications and subscriptions. Event subscriptions are generated for transmission to event subscription service 235. Event notifications are received from event publication service 236.

Business scenario module 902 includes a business scenario defining a temporal ordering of message exchanges between cooperating applications. It also defines the reaction of these application objects to such messages. Defining the business scenario includes identifying the participating attributes and methods for the collaborating application objects. Object reaction behavior is described by a set of declarative constraints and causal rules which may be enabled unconditionally or based on the state of the object.

All communication between applications is managed and enforced by application collaboration objects. Application collaboration objects allow interchange users to define interactions between connector objects. One example of an application collaboration module is automatically generating an invoice and adding the amount to the accounts receivable entry in a financial system when a customer support application logs a new support call.

An application collaboration object is defined by a set of business scenarios stored in business scenario module 902. An application collaboration module has a single, business process oriented function. Several applicable collaborations may exist between any two applications, and collaborations may involve more than two applications. The single business process function may involve multiple transactions, also called scenarios. For example, an application collaboration module which replicates employees across two or more applications would require handling hiring, firing, and status changes, all of which constitute different scenarios for the same application collaboration module.

Application collaboration modules are controlled through property sheets. Property sheets are the customers interface to control the configuration of an application collaboration module or any of its participating application objects. Examples of application collaboration module properties are diagnostic level, user name/password, and integration scenario specific properties. Properties of the participating application objects include setting the maximum, minimum and default values for any of the attributes of these application objects, and the values of integration specific properties.

Since application collaboration objects are first class entities, they display typical object properties such as inheritance, polymorphism, etc. Application collaboration objects expose a well-defined interface in order to allow it to participate as an application object in another collaboration.

Referring now to FIG. 10, a message flow between objects for a bill-by-call business scenario is shown in which the arrows from one object to another define the object interactions as ordered message flows between these objects. A business scenario includes identifying the message flows, the participating application objects, their attributes and methods, and the business rules associated therewith. Execution of any business scenario in an application collaboration module may typically be triggered by an event or message generated by an interchange service object, a connector object or another application collaboration object.

Referring again to FIG. 9, each scenario or set of object interactions is reduced and encapsulated into a Finite State Machine (FSM) 906. When triggered by an event, the FSM represents the process flow. To exert further control, events, conditions and actions can be manipulated directly in the FSM to modify interaction behavior. The FSM associated with each scenario is stored as an attribute for that application collaboration object and is triggered by an event or message sent to that application collaboration object.

FSM implementations may be decomposed such that "actions" in the FSM translate into one of the following mechanisms, based on location, transaction and performance requirements for the application collaboration module and the participating application objects at execution time. These mechanisms may include function dispatching (a simple local or remote function call), which is synchronous; messaging, which is similar to remote function dispatching except that it will perform asynchronous execution of the function (this is achieved by sending a message to a remote object with a request to execute some function using a reliable delivery capability of the messaging system); and event generation or state change within the same or another FSM. The function calls may implement business rules for operating on attributes of objects, or data received through messaging or event services.

In one embodiment, application collaboration modules are generated in the Java language and extend the base collaboration Java class and interface (also known as subclassing in object systems).

Referring now to FIG. 11, in a method for constructing an application collaboration module, an application collaboration module builder defines a configuration of inter-related application objects required to perform the cross-application integration (1100). Such configuration should represent a single business process ranging from a simple to a more complex integration such as integrating a manufacturing schedule plan in a supply chain optimization application with an ERP (Enterprise Resource Planning) application. Defining this configuration includes identifying the participating application objects (1102), their attributes and methods required to perform the required application integration (1104) and a "relationship" between the application objects (1106).

Thereafter the set of business scenarios driving the message interactions amongst the application objects within the application collaboration module is identified (1108). Each scenario may represent a business process, a system management scenario, or a set of "business" transactions from the user's view. The set of all scenarios that logically perform participating functions in a single business process are grouped into one application collaboration module.

After defining the scenarios, the generic set of classes and their relationships which consolidate and abstract the structure and behavior of the application objects is identified (1110).

Finally, the behavior is modeled (1112). The model may be decomposed by dividing it into iterative steps to create a finer granular form if needed (1114). This allows iterative development such that the solution starts from the highest business model and iterates down to fine grained service objects as needed.

Application collaboration objects are re-usable across application objects derived from different vendors for the same application class. This is achieved by having the application collaboration object request the participating application object for the required business behavior (method) and by not incorporating or developing such behavior as part of the application collaboration object itself. All such vendor specific functionality is encapsulated in connectors, allowing the application collaboration module objects to be re-usable across different vendor's application for the same application class.

Application collaboration objects are installed in the interchange server using the set-up and configuration tools. Configuration tools allow setting the property sheets associated with the application collaboration module such as setting the billing rate in a bill-by-call collaboration when that value is not available from any of the participating applications.

In addition, application collaboration modules allow for configuration of various properties which control runtime and processing criterion such as: instantiation characteristics (start-up or event); transaction semantics (synchronous 2PC with participating applications or asynchronous messaging with compensating transactions); execution timing (scheduled and timed); and enablement (enable/disable) of any participating business scenarios.

A process flow associated with application collaboration module 40 (FIG. 1) is shown in FIG. 12. Referring now to FIGS. 3 and 12, application collaboration module receives an initialization request from interchange server 20 as part of the instantiation process (1200). The application collaboration module issues event subscriptions associated with the business scenario stored within the business scenario module (1202) and then returns an acknowledgment signal to interchange server 20 in response to the initialization request (1204). Thereafter, application collaboration module waits for the delivery of a subscribed event to trigger the beginning of a collaboration or an administrative request from the interchange server (such as a shutdown).

Upon receipt of an event notification (and associated object), or in response to an object received from interchange server 20 or application connector 30, business scenario module 902 (FIG. 9) executes the methods called for in the object. If the object is an event notification (1207), the business scenario module requests a new saga from the transaction service (1208). Upon receiving a new saga request acknowledgment from the transaction service, business scenario module 902 (FIG. 9) initiates (1210) and executes (1211) the finite state machine associated with the scenario stored within the business scenario module. At each sub-transaction within the scenario, business scenario module requests the transaction service to record the underlying sub-transaction in the saga (1212). Thereafter, the business scenario module operates on the data received in the event notification (or object delivery) (1214) and generates objects (by object representation module 900 of FIG. 9) for transmission to one or more application connectors (1216). The process continues generating sub-transaction requests and objects until an end of the scenario is reached (FSM execution terminates) (1218) or a forced shutdown request is received (1220).

If the finite state machine has executed to termination, then a final transaction request is generated and transmitted to the transaction service to delete the saga stored therein (1222). Thereafter, a check is made to determine if a shutdown flag (either a "graceful" or "Forced" shutdown flag) has been set (in steps 1230 and 1233) (1223). If so, then a shutdown of the application collaboration module is initiated (1224). If not, then the process continues at step 1206.

If a forced shutdown flag is set at step 1220, then a saga undo request is issued to the transaction service (1226). Thereafter, the application collaboration module initiates its shutdown 1224. Alternatively, the application collaboration module may attempt to complete all transactions after a forced shutdown is received and thereafter invoke its own shutdown procedure at the completion of any ongoing transaction process.

If the object received at step 1207 is not an event notification, then a check is made to determine if the object received is a forced shutdown request (1228). If so, a check is made to determine if a finite state machine is executing in the application collaboration module (1229). If not, then application collaboration module will initiate its shutdown procedure (1224). If a finite state machine is executing, then a "forced" shutdown flag is set (1230) and the process continues at step 1206.

If the object received is not a forced shutdown request (step 1228), then a check is made to determine if the object received is a "graceful" shutdown request (1231). If so, then a "graceful" shutdown flag is set (1233) and the process continues at step 1206. If not, then the object is in response to a request generated by the application collaboration module due to the execution of an existing finite state machine. Accordingly, the execution of finite state machine may be resumed (1232).

During operation, error and exception service 260 (FIG. 3), monitors the state of services and interchange server components. If an error occurs, the error and exception service generates an error signal for transmission to the application collaboration module. If the error is fatal (e.g. the messaging service has failed), then the application collaboration module initiates a backward recovery and then performs a shutdown. If the error is not fatal, then a determination is made whether the collaboration needs to be terminated. If the collaboration is itself the source of the error, then the collaboration is required to be shutdown and accordingly, a backward recovery is initiated followed by a shutdown of the application collaboration module. Alternatively, a forward recovery may be attempted if the error does not implicate the application collaboration module itself.

Collaboration Definition Tool

Collaboration builders are not required to write procedural programs to build collaborations. The collaboration definition tool reads the repository to get the business objects supported by installed connectors and the generic class hierarchies available to collaboration developers. This information is presented to collaboration developers in a visual, hierarchical form.

Collaboration developers may use these application classes and model them as objects using the supported object modeling methodology's visual notations. The application integration scenarios may be modeled by drawing lines and arrows to signify message exchanges amongst the application objects available and by picking from a list of supported methods (corresponding to application objects), the method to invoke as a reaction to a received message along with appropriate arguments. Business rules and constraints are defined through the use of an integrated rules definition table and incorporated into the business scenario diagrams at well-defined anchor points. Any data transformations, if needed, are similarly defined using a data-transformation tool with hooks to anchor in such transformations into the application integration scenario. Collaboration developers are thus able to build the entire collaboration using visual tools. An example is shown in FIG. 10. This is just a sample visualization, the actual visual will depend on the object modeling methodology supported by the modeling tool.

After the collaboration has been visually modeled and all parts of it is defined, the collaboration definition tool reduces the business scenarios into a finite state machine and generate configuration information and Java class files. All collaboration configuration, including details of participating objects/classes, their attributes and participating methods, relationships between the objects, the finite state machine, configured properties such as locational, execution and transactions semantics, etc. are stored in the repository during collaboration installation. The supporting Java class files depicting the collaboration and generated by the collaboration definition tool are stored in a well-defined location and a path to this is stored in the repository.

The application collaboration module, once installed can be configured and managed by other interchange tools as needed. For collaborations that require new business objects, programmatic tools are available to let such objects be created and built either by using the connector development toolkit (if new objects are to come from a connector) or by writing Java code, if the object is local to a collaborator.

Connectors

Connectors interface between the interchange server and business applications. Each connector is application area and vendor specific. The connector utilizes the application's API, and transforms data and operations in the application to and from the interchange server's object and event model. For example, a human resources (HR) application may have the concept of an employee, and mechanisms for adding employees and changing their salary. The corresponding application connector provides a representation of the employee in the interchange server's object model. It is the responsibility of the connector to detect and keep track of changes in the application, and if necessary issue events.

Connectors manipulate the application API's to extract information from and deposit information to the application. Information in this context means both data and function.

Connectors represent the data and function from an application in interchange server as an application object. The application object model follows the base object model defined by the interchange server.

Connectors also bridge any semantic and syntactic gaps between application's data and behavior and its representation in the interchange server. This involves performing appropriate data transformations and implementing behavior semantics needed to present application data and behavior into the defined object model.

Connectors may incorporate vendor/application specific business rules and logic (constraints) needed to provide the correct behavioral semantics expected or desired by a particular application collaboration module. For example, an application collaboration module may desire to receive data relating to customers only from the "North American" region while the application may not distinguish between customers in regions. In such cases, the connector may be tailored to include business logic to only pick up those customers which fall in the "North American" region.

The business logic provides filtering at the source of data entry into the collaboration model. Rather than requiring all data of a particular type (customers from across the world) to be received and be processed at the collaboration level, the connector business logic can be effectively used to pre-screen all incoming data to assure a match with the needs and wants of a particular collaboration. Filtering at the source frees up interchange server resources by minimizing the traffic of data to a collaboration to be exactly of the type requested without regard for the support of the particular data distinction at the application level. Filtering at the source may also be used to distribute events across multiple interchange servers to achieve load balancing, deploying across geographically distributed topologies and enforcing business logic.

Filtering at the source may be realized by including the business logic in the connector level to pre-screen event data. Collaborations may thereafter provide precise event subscription information to the subscription service that includes the desired filter. The filter information may be hard-coded at the time the connector is constructed by the developer. Alternatively, the filter information may be transferred to the connector at intitialization or dynamically updated over time. During the initialization process, the connector downloads a definition for all objects (business objects) that it will support. The repository in the interchange server includes meta-data providing definitions for objects which are supported by a given connector. A business object definition may include an attribute which defines the filter function. For example, a connector may be required to support a delete employee business object which includes an attribute "OVER65" that indicates that only employees with ages over 65 are to be deleted. The filter information (attribute OVER65) may be used by the connector to screen events for transmission to the interchange server. A meta-data management service associated with each connector is used to retrieve the object definition information for each connector from the repository for use by the connector. The meta-data management service may be used to dynamically update objects after the connector initialization phase in support of run-time business collaboration execution requirements.

Connectors may provide application and/or vendor specific functionality needed by an application collaboration module, which is not provided by the application, by incorporating it within the connector. An example here is a financial accounting system which does not provide a billing function. For a bill-by-call application collaboration module, such a billing function is incorporated in the connector for the financial application.

Connectors provide event notifications to application collaboration modules and interchange servers when changes in applications occur. Other functions provided by the connectors include error handling and communication "middleware" (to communicate with the interchange server for in-process, out-of-process and over local and wide area network topologies). Connectors may also support management interfaces to allow management tools to manage the connector as any other component, install, setup and configure connectors, and provide security (for secure transactions between connectors and the interchange server). In addition, connectors may include a proxy service including compensating transaction queues for executing compensating transactions as described above.

Referring now to FIG. 13, a connector 30 includes an API manipulator 1300, a data transformer 1302, a business rules and constraint module 1304 including meta-data management service 1305, a business encapsulation module 1306, a message transformer 1308, a communication module 1310, an object representation module 1312, a configuration tool set and management interface 1314 and error handler 1316. A connector 30 may also include proxy service 1317 including compensation queue 1319.

Typically, an application connector does not interact directly with the application's data which may be residing in a Data Base Management System. Instead, the interchange operates against vendor supplied API's using an application specific API manipulator 1300. This allows all connector operations to run against the application's own processing logic, thereby reducing the dependency on the application vendor's internal logic and schema changes. For example, in a customer support application, adding a new customer in a customer table requires that the customer agreement information (billing rate, support level, 24×7 support information, etc.) be updated in an agreement table. API manipulation is the most vendor (and application) specific part in any connector and is layered at the bottom of the connector's logical stack.

Connectors provide bi-directional syntactic and semantic transformations when going from applications', data and function into the interchange server object model and vice-versa. These functions are provided by the data transformer 1302, the business rules and constraints module 1304 and business encapsulation module 1306.

Data Transformer 1302 transforms the application data and function to a data format suitable to the connector. Data transformer includes an interactive tool 1320 to visually define the data formats for transformation, which will be bundled with the connector development tool, and a runtime component 1322 which performs the actual transformations and is embedded in the connector executable code. Interactive tool 1320 describes the input and output formats and appropriate conversions. These conversions range from implicit syntactic conversions to semantic-content based conversions. The tool provides mathematical (+, −, *, /, . . . ), string (truncate, append, etc.), logical (>, <. >=, etc.) and boolean (AND, OR, NOT, etc. operators which work on the contents of input and output fields. It also provides hooks to incorporate foreign language functions, if needed. Examples of foreign language functions are functions that may read an external table from a different data source such as a flat file for validating information. Typically, data transformations are performed as soon as the data is read from the application or just before the data is written into the application, or, depending on the application collaboration logic, may be performed in different points in time for a given connector.

Business rules and constraints module 1304 includes a tool to define a set of rules 1330 which contain the information necessary to enforce vendor specific business rules and a rules engine 1332. The rules engine 1332 evaluates the rules. Meta-data management service 1305 downloads definitions for all objects that are to be supported by a connector. As described above, attributes for a particular object may define a filter to be used by the connector. The filter is stored as a rule for processing by rule engine 1332. For example, a business application may provide business records for customers from across the world. A collaboration may only require the records associated with a particular geographical region. The business encapsulation module provides a screen to filter such records and only provides those appropriate records as objects to the application collaboration module by having a business rule (stored in the set of rules 1330) which filters such records.

Business encapsulation module 1306 adds business functionality which is not provided by the application but is required by the application collaboration module. For example, if a customer support application does not keep track of the accumulated time for all support calls logged against a case, then the business encapsulation module 1306 is used to accumulate and store persistently the time logged against a case by totaling the time for each support call in the database as required to provide the business functionality desired.

Event notifications initiate processing in an application collaboration module. Events are also used to communicate changes between various components. Events are generated from connectors to allow applications to communicate modifications in the application's data to the interchange server. Connectors keep track of changes occurring within the application and communicate them through events to the interchange server.

Connectors rely on persistent event notification from applications by having connectors queue them into a reliable messaging system to prevent loss of such events in case of failure within the components. In case of connector failure, the connector determines and communicates to the interchange server all changes that occurred after the connector failed. The message transformer 1308 and communication module 1310 provide the message oriented middle-ware (MOM) to transport messages within connectors as well as between connectors and interchange servers. A similar mechanism is used in interchange servers. Messaging middle-ware provides the asynchronous semantics needed by the execution environment to support inter-operability between geographically distributed applications by providing sequential queuing with reliable delivery. This provides assurance that applications do not wait for acknowledgments over slow wide area networks and they can continue doing work. The underlying assumption is that the message queued to a remote system will definitely be delivered. MOM also provides the semantics for handling instances when the application is unavailable by queuing their messages to a persistent store. When the application starts up again it retrieves its messages from the store, in the correct order, and processes them. This MOM implementation also provide time-outs on messages in order to expire messages and generate errors requiring transaction abort and recovery in the collaboration.

Object representation module 1312 builds object wrappers around the application's data and behavior and present it using the interchange server's base object model. The wrappers provide a framework to accurately represent the application's data and function schema as required by the application collaboration module, irrespective of whether such data and function reside in the application or the connector itself. Wrappers also interpret the generic framework and represent the framework contents in the interchange server's base object model. This is a bi-directional mechanism which also converts from the interchange server's object model into the framework for execution in the connector. Finally, the wrappers provide semantic content in a specific wrapper or framework, which describes the meaning of a given application object, such as what are its attributes and its functions and what do they do.

In one embodiment a proxy service 317 is included in connector 30. Proxy service 317 may include methods for logging actions associated with a transaction and for storing compensating transactions associated therewith in a compensation queue 319. Each action received may include explicit or implicit compensating transaction information. Compensation queue 319 may include a plurality of individual transaction queues one for each transaction active in a given connector. Each transaction queue is configured as a FIFO (first-in-first-out), allowing for the sequential rollback of actions based on receipt at the connector. Proxy service 317 is responsive to objects received from the interchange server to rollback individual ones of actions stored in a respective transaction queue or may initiate rollback of an entire queue. At the completion of a rollback, proxy service 317 provides an event notification to the interchange server to indicate the success (or failure) of a compensating transaction (or individual compensating action).

In one embodiment, connectors are built using any language and are exposed to the interchange server using Java wrappers, CORBA IDL or Microsoft's OLE/Activex technology. Interchange server provides hooks for invoking (tying in) components in any of the above stated forms. A base connector class/interface is defined which is extended to provide base classes for the 3 types (Java, IDL and OLE/Activex).

Application objects are represented by their class definitions at the time of application collaboration module creation. It is only at run-time that application objects are instantiated by the connector as virtual objects. Application collaboration objects are independent of the participating application's platform of execution. Minimally, they execute on the same platform on which the interchange server executes.

Error handler 1316 synchronizes with management interfaces, logging facilities and error handling services in other components. Configuration tools 1314 support various management interfaces. These interfaces adhere to platform specific management interface standards so that existing management tools are able to manage the connector process. Configuration tools also allow for the installation of application connectors.

An application connector is a component which operates like an "object factory". This means that it supports an interface that can do things like "create object", "get object", "destroy object". These objects include connector, application and virtual objects. They represent objects, data, and services provided by the application, collaboration or server. In many cases, these objects are "proxy" objects. They represent remote objects but don't actually contain any object state.

When the interchange server needs to access a connector object, it gets a "handle" to that object. From the perspective of an interchange server, any object presented by a connector is similar in that the interchange server does not care where exactly that object resides (data and function). Neither does it keep track of state information for connector objects. State information for the object, if necessary, is maintained by the connector. If the collaboration needs some state of a connector object, then it creates a local object which is a snap-shot copy of the connector object and uses that for local processing. Collaborations cannot rely on connectors to maintain any object state information unless explicitly required for transactional consistency. In one embodiment, connector objects are cached to speed performance of the collaboration process.

Each application connector supports a set of pre-defined object "types" that it knows how to deal with. An HR application, for example, supports an employee type. A customer service application supports a customer type. All application connectors are required to support a minimal set of facility object types for the purpose of providing required services, for example an event service type, an event type, a transaction service type, a transaction type, a receive method, a consume method, etc. In one embodiment, the object representation module uses an event-based publish and subscribe mechanism in lieu of looking at events just from a service perspective, thus events are just another form of business object which are published and subscribed to.

When an object is received either due to an event subscription or in response to the invoking of a consume method, a connector communicates with the application, retrieves the data necessary to construct the requested object (for example, generate queries to a database), applies the necessary data transformations, rules and business logic, constructs the object, and returns a handle to the object to the requester/subscriber by invoking the requester's receive delivery or consume methods.

The connector communicates with the application by either calling the application API directly, or by communicating with a gateway process which in turn, calls the application API. Such communication can be achieved more efficiently using an event based publish-subscribe mechanism.

Events in the interchange server may be external or internal. Internal events are those generated by the services within the interchange server such as application collaboration modules, timers, synchronization primitives, other services. External events are those generated by external components such as connectors or other interchange servers.

Referring now to FIGS. 13 and 14, a process flow for connector 30 is shown. At initialization, connector 30 publishes a list of events that it is responsible for in each collaboration (1400). The connector then subscribes to events according to its associated business scenario by providing an event subscription via message transformer 1308 to the interchange server (1401). Thereafter, the connector waits for receipt of information from either the application or the interchange server. Information from the application may take the form of event triggering information or information returned from the application responsive to a request for information from an application collaboration module. Information from the interchange server may take the form of a business object request from the application collaboration module or the return of a requested business object from the collaboration based on a subscription by the connector. If application information is received by the connector (1402), data transformer 1302 converts the information into the appropriate format for business rules and constraints module 1304 (1406). Business rules and constraints module 1304 executes a run time evaluation of the associated rules to incorporate the specific vendor/application semantics expected by the application collaboration module (1408). The event may be screened out at this step and not provided to the interchange server, depending on filter information that may be present in the rules. If the information is to be passed on to the interchange server, business encapsulation module may add any required business functionality which is not provided by the application but is required by the application collaboration module (1409).

Thereafter an event notification is generated by message transformer 1308 (1410) and an appropriate object is created according to the interchange object base model by the object representation module 1312 (1412). The object and event are transferred as a business object to the application collaboration module by the communication module 1310 via the interchange server (1414).

If interchange server information or requests are received, such requests (or responses to requests) is processed by message transformer 1308 (1416) and the object is transformed into the appropriate format for the connector by the object representation module 1312 (1418). The encapsulation module adds any functionality that is required at the connector level (1420). Thereafter, the business rules and constraints module 1304 executes a run time evaluation of the associated rules to incorporate the specific vendor/application semantics expected by the application (1422). Data transformer 1302 converts the information into the appropriate format for API manipulator 1300 (1424), which in turn transfers the information to the application (1426). The information returned to the application may be in the form of data to be manipulated by the application or a request for data to be used in the collaboration.

This process continues until a shutdown request is received. A shutdown request may include a compensating transaction, or may only require the shutdown of the connector. Upon receipt of a shutdown request, connector 30 performs any compensating transactions received from the exception service or an application collaboration module then initiates its own shutdown procedure.

Administrative Tools and Interfaces

Referring now to FIG. 15, administrative tools 50 (FIG. 3) includes an installation tool 1502, set up tool 1504, a configuration tool 1506, and management interfaces 1508.

Installation tool 1502 is used for installing, collecting required parameters, and removing components in the interchange server. The installation tool is meta-data driven such that the information that guides the tool is stored in the components themselves, rather than being known intrinsically by the tool.

The setup tool 1504 installs a component into any interchange server within its administrative domain.

Configuration tool 1506 is also a meta-data driven tool for viewing and changing the configuration of installed interchange servers, application collaboration modules and connectors. In addition to configuration, it also allows customers to enable or disable executing components. Configuration meta-data is stored as properties in the interchange objects (objects which have configurable properties inherited from a base class that provides the configurable property behavior). A property provides a name, a data type, default value, and rules for allowable values. Configuration tool 1506 performs automatic version management when revising (or originally configuring) versions of participating applications. When upgrading to a different version of a participating application, the configuration tool will determine if any other components are required or if alternative action has to be performed.

Management interfaces 1508 are also meta-data driven. The meta-data populates a standard interface such as SMS or SNMP. Standard system management tools are used to access those interfaces. There are two kinds of administrative interfaces: resource administration (which servers are up, show me the threads, show me memory utilization, tell me when the log is x % full, etc.) and integration operation administration. The former are provided through the support of standard administration framework hooks.

Development Tools

Referring now to FIG. 16, development tools 60 (FIG. 3) include a connector development kit 1600 that enables customers and vendors to build their own connectors. This will be particularly useful for customers who wish to integrate home-grown applications with the interchange. The connector development kit includes interchange protocols and API's 1602, a connector framework 1604 (which would provide a set of classes in the form of source code), a packager for packaging the connector as a component 1606 and rules and data transformation tools 1608.

Bill by Call Collaboration

A practical example of a collaboration is a "bill-by-call" application collaboration module where a call tracking (customer support) application, upon completion of the call, sends a request to a billing application to generate and send an invoice to the customer. The business process interactions between the call tracking application and the billing application are through a bi-directional exchange of messages. For the call tracking application, the data required is the Customer ID, Name, Address and Billing Rate. The business functionality desired consists of CalcCallDuration (to calculate Call Duration) and tellNameAddressid (to get the Callers Name, Address and Customer ID) from the call tracking application.

The data required for the billing application is Customer ID, Billing Address, etc. The business functionality desired are VerifyCustDetails (to determine if this is a valid customer) and Geninvoice (to generate and send the invoice to the customer). The message flows associated with this type of collaboration are shown in FIG. 10.

Although simple at one level, the above application collaboration module can actually be quite complex under diverse conditions such as (a) when the Customer IDs in the two applications are not similar or (b) when the billing rate may be provided by either the call tracking application, the billing application or the application collaboration module itself. Using the configuration tool, the user may set more specific options, such as: how to round the call duration; or to specify if it is a fixed charge per call or charged per minute; whether calls are billed individually or lumped together; to determine if the caller gets a certain amount of support free; and to identify who provides the rate of billing (one of the applications, the application collaboration module or if it is derived from somewhere else).

The installation and configuration process sets properties on interchange server's objects and adds those entries to the repository. The repository also maintains information on the existence and location of the two connectors and the application collaboration module. When the interchange server boots, it contacts the repository and finds out what components it's supposed to start up. In this case, it would be the two connectors and the one collaboration. The boot process would start up these components and then exits. When a component starts up, it consults its properties to determine its startup parameters. In the case of the connectors, the parameters would include the network location of the applications to be connected to, and information about how those applications were customized. In the case of the collaboration, the startup properties include things like which connector to use, when to instantiate the application collaboration object (start-up or on-request), etc. Note that the identity of the connector is specified as a name in a registry in order to preserve location transparency. Similarly application collaboration objects will have a name in the registry in order to let other interchange server's access that object directly.

The call tracking application connector presents an object-and-event oriented interface to the interchange. For the sake of this example, imagine that the objects are Product, Customer, Case, and Call. Events might be NewCase, CallCompleted, and CaseClosed. An example of one of the methods supported by the call tracking connector would be ReturnCaseHistory which returns information on all calls and on the duration of each for any given case.

Similarly, the billing connector provides a billing object which exposes the accountsReceivables, and billAccount methods. Note, that we have separated out the accountsReceivables method in order to maximize flexibility. This method updates the invoice information in the accounts receivable system. In most cases customers will want to control which bills are automatically inserted into accounts receivable. Providing accountsReceivable as a separate method simplifies the need to make the automatic insertion of bills into accounts receivable user controllable. In cases where the bill is to be inserted, the method is invoked. In cases where the insertion should not be performed, the method is not used.

When the interchange server boots up, it first instantiates all connectors, followed by all application collaboration objects. At instantiation, the billing application's connector subscribes to the call tracking connector's CaseClosed event (assuming that the system is not supposed to generate a bill until the case is closed). The call tracking connector generates a CaseClosed event when the support analyst closes the case by setting the status of the case to CLOSED. Upon receiving the CaseClosed event, the collaboration object queries the call tracking connector for all the calls for that case and their duration by invoking the ReturnCaseHistory method on the case number in question. The returned call duration is converted into a dollar amount according to the business rules specified by the application collaboration object's properties. It might also have to query the call tracking connector to translate Customer ID to a customer name or it may have to map the Customer ID in the call tracking application to the Customer ID in the billing application.

The collaboration object then invokes the billAccount function for the billing object in the billing connector, passing it the customer name, the dollar amount, and a text string describing the calls and the case. Successfully generating the bill will probably require multiple data conversions. Translating the customer's name into the Financial system's Customer ID might be necessary and there may be currency localization issues to address with regards to the representation of the dollar amount. Since these conversions need to be addressed prior to the actual submission of the billing information into the accounts receivable application, the collaboration object needs to be able to handle conditional data conversions, based on a pre-determined set of dynamically determined business rules.

Once all data translation steps have been processed, the collaboration can invoke the accountReceivables function in the billing connector to update the "just billed" amount to the accounts receivable.

The present invention has been described in terms of specific embodiments, which are illustrative of the invention and are not to be construed as limiting. Other embodiments are within the scope of the following claims.

The invention claimed is:

1. An interchange server for coupling with a plurality of connectors, the connectors being configured for communicating with a like plurality of applications, the server comprising:
   an application collaboration module for defining a generic portion of an interoperability function, the collaboration module comprising:
   a transaction service responsive to a trigger for initiating the inter-operability function and being activated upon receipt of data from one or more connectors; and
   an error service for monitoring errors in the interchange server and upon detection of an error stopping an execution of a transaction and triggering an execution of any required compensating actions to undo an interrupted transaction;
   the trigger and the transaction delivering data to one or more connectors for transfer to an associated application whereby the inter-operability function is realized while each application is executing independently in an unmodified state.

2. The interchange server of claim 1 further comprising a service module for transferring data and methods between connectors and the application collaboration module, whereby the inter-operability function is realized while each proprietary application is executing independently in an unmodified state unaware of the defined interoperability.

3. The interchange server of claim 1 further comprising a business module including business methods and transforms for screening data for transfer between the associated application and the application collaboration module.

4. A computer-usable medium comprising program code for execution by a computer to perform the following steps:
   defining an inter-operability function between a first and a second application;
   dividing the inter-operability function into generic and vendor specific sub-pieces;
   creating a generic application collaboration module for storing and executing the generic sub-pieces of an interoperability function;
   creating two application-specific connectors for storing and executing the vendor specific sub-pieces of the inter-operability function associated with the first and second applications;
   linking the generic application collaboration module and two application-specific connectors to achieve the inter-operability function; and
   monitoring errors in an interchange server and upon detection of an error stopping an execution of a transaction and triggering an execution of any required compensating actions to undo an interrupted transaction.

* * * * *